US007761677B2

(12) United States Patent
Arakawa et al.

(10) Patent No.: US 7,761,677 B2
(45) Date of Patent: Jul. 20, 2010

(54) CLUSTERED STORAGE SYSTEM AND ITS CONTROL METHOD

(75) Inventors: Hiroshi Arakawa, Sagamihara (JP); Takashi Oeda, Sagamihara (JP); Naoto Matsunami, Hayama (JP); Kouji Arai, Odawara (JP)

(73) Assignee: Hitachi, Ltd., Tokyo (JP)

( * ) Notice: Subject to any disclaimer, the term of this patent is extended or adjusted under 35 U.S.C. 154(b) by 787 days.

(21) Appl. No.: 10/300,555

(22) Filed: Nov. 20, 2002

(65) Prior Publication Data

US 2003/0188085 A1 Oct. 2, 2003

(30) Foreign Application Priority Data

Apr. 2, 2002 (JP) .............................. 2002-100220

(51) Int. Cl.
*G06F 12/16* (2006.01)
(52) U.S. Cl. ....................................... 711/165; 711/114
(58) Field of Classification Search ....................... None
See application file for complete search history.

(56) References Cited

U.S. PATENT DOCUMENTS

| 5,956,750 | A | | 9/1999 | Yamamoto et al. |
| 6,557,035 | B1 | * | 4/2003 | McKnight .................... 709/224 |
| 6,598,134 | B2 | * | 7/2003 | Ofek et al. ................... 711/162 |
| 6,711,649 | B1 | * | 3/2004 | Bachmat et al. .............. 711/114 |
| 6,745,281 | B1 | * | 6/2004 | Saegusa ....................... 711/112 |
| 6,779,078 | B2 | | 8/2004 | Murotani et al. |
| 6,924,780 | B1 | * | 8/2005 | Horst et al. ...................  345/82 |

(Continued)

FOREIGN PATENT DOCUMENTS

JP 09-274544 10/1997

(Continued)

OTHER PUBLICATIONS

English translation of Japanese office action for corresponding Japanese patent application number 2002-100220 lists the references above. The Examiner comments on the relevancy of non-English language references.

(Continued)

*Primary Examiner*—Hetul Patel
*Assistant Examiner*—Kaushikkumar Patel
(74) *Attorney, Agent, or Firm*—Hogan Lovells US LLP

(57) ABSTRACT

A clustered storage system includes a plurality of nodes and a management server that consolidates physical position information concerning data in each of the nodes. The management server includes a process to relate the information to the configuration of the clustered storage system and the configuration of each node and present such relations. Each node has a process to obtain the size and load of resources that are used in processing. The management server has a process to collect and tally such resource usage status from each node, and a process to relate the resource usage status, the data information and configuration information to each other and present the relations in a hierarchy. The clustered storage system has a process to move logical volumes among nodes in a manner transparent to the host computer. The management server has a process to support the selection of source data and destination physical position through information display, and a process to receive instruction for such move and to direct the clustered storage system of such move.

32 Claims, 13 Drawing Sheets

U.S. PATENT DOCUMENTS

2002/0091746 A1* 7/2002 Umberger et al. ............ 709/105
2002/0174419 A1* 11/2002 Alvarez et al. .............. 717/168
2002/0175938 A1* 11/2002 Hackworth ................ 345/751

FOREIGN PATENT DOCUMENTS

| JP | 11-167521 | 6/1999 |
|---|---|---|
| JP | 2000242434 A | 9/2000 |
| JP | 2000-293317 | 10/2000 |
| JP | 2001-067187 | 3/2001 |

OTHER PUBLICATIONS

Japanese language office action and its partial English language translation for corresponding Japanese application 2002100220 lists the reference above.

* cited by examiner

| Logical Volume No. | Port No. |
|---|---|
| 0 | Port 1-A<br>WWN=50:00:60:a8:02:f0:67:02<br>LUN=00 |
| 4 | Port 1-B<br>WWN=50:00:60:a8:02:f0:67:03<br>LUN=02 |
| 5 | Port 1-C<br>WWN=50:00:60:a8:02:f0:67:01<br>LUN=01 |
|  |  |

| Logical Volume No. | Node No. | Physical Disk No. | Physical Address | Capacity | Destination Node No. | Destination Physical Disk No. | Distination Physical Address | Status |
|---|---|---|---|---|---|---|---|---|
| 0 | 3 | 1 | 1000 | 1000 |  |  |  | Nomal |
| 4 | 2 | 2 | 1500 | 2000 | 3 | 7 | 2000 | Moving |
| 5 | 5 | 4 | 2000 | 2500 |  |  |  | Normal |
| 8 | 3 | 5 | 3000 | 3000 |  |  |  | Normal |
|  | 4 | 6 | 2000 | 1000 |  |  |  |  |
| 12 | 5 | 3 | 1000 | 1500 |  |  |  | Failure |
|  |  |  |  |  |  |  |  |  |

| Physical Disk No. | Physical Address | Memory Address | Dirty Flag |
|---|---|---|---|
| 10 | 9990 | 10010 | Reflected |
| 11 | 10 | 10020 | Reflected |
| 11 | 20 | 10030 | Not reflected (Dirty) |
|  |  |  |  |

204

| Whole / Logical Volume No. | Cache used (MB) | Cache Transfer Rate (MB/s) | Cache Hit Rate (%) | Processor Utilization | | Bus Utilization (%) | Cache Transfer Rate (MB/s) | Memory used (MB) |
|---|---|---|---|---|---|---|---|---|
| | | | | Processor 1 | Processor 2 | | | |
| Whole | 1000 | 1000 | 80 | 30 | 30 | 30 | 1000 | 1000 |
| 0 | 100 | 100 | 70 | 5 | 0 | 5 | 100 | 100 |
| 10 | 200 | 200 | 85 | 0 | 3 | 3 | 200 | 200 |
| | | | | | | | | |

| Whole/ Logical Volume No. | Processor Utilization | | Bus Utili-zation (%) | Bus Trans-fer Rate (MB/s) | Memory used (MB) | Disk Utilization | | | | | |
|---|---|---|---|---|---|---|---|---|---|---|---|
| | Proce-ssor 1 | Proce-ssor 2 | | | | Physical Disk No. | Sequen-tial Read (%) | Sequen-tial Write (%) | Random Read (%) | Ran-dom Write (%) | Total (%) |
| Whole | 30 | 30 | 30 | 1000 | 1000 | 0 | 2 | 1 | 30 | 28 | 61 |
| | | | | | | 1 | 20 | 21 | 4 | 4 | 49 |
| | | | | | | | | | | | |
| 0 | 5 | 0 | 5 | 100 | 100 | 1 | 13 | 15 | 1 | 2 | 31 |
| 10 | 0 | 3 | 3 | 200 | 200 | 10 | 3 | 4 | 10 | 9 | 26 |
| | | | | | | | | | | | |

| Logical Volume No. | Port No. | Port Node No. | Node No. | Physical Disk No. | Physical Address | Capacity |
|---|---|---|---|---|---|---|
| 0 | Port 1-A<br>WWN=50:00:60:e8:02:f0:67:02<br>LUN=00 | 1 | 3 | 1 | 1000 | 1000 |
| 1 | Port 2-C<br>WWN=50:00:60:e8:02:f0:68:03<br>LUN=02 | 2 | 5 | 7 | 1000 | 1500 |
| 2 | Port 2-D<br>WWN=50:00:60:e8:02:f0:68:04<br>LUN=03 | 2 | 5 | 5 | 2000 | 2500 |
| 3 | Port 3-E<br>WWN=50:00:60:e8:02:f0:69:03<br>LUN=04 | 3 | 2 | 5 | 3000 | 3000 |
| | | | | 3 | 6 | 2000 | 1000 |
| 4 | Port 1-B<br>WWN=50:00:60:e8:02:f0:67:03<br>LUN=02 | 1 | 3 | 2 | 1500 | 2000 |
| | | | | | | |

404

| Node No. | Physical Disk No. | Physical Address | Capacity |
|---|---|---|---|
| 1 | 2 | 8000 | 3000 |
| 2 | 3 | 10000 | 2000 |
| 3 | 4 | 12000 | 3000 |
| | | | |

CLUSTERED STORAGE SYSTEM AND ITS CONTROL METHOD

BACKGROUND OF THE INVENTION

1. Field of the Invention

The present invention relates to a storage system and a control method for the storage system, and more particularly to a clustered storage system in which a plurality of storage system nodes is made operable as a single storage system, and a control method for such a storage system.

2. Related Background Art

A storage system may be structured by using a common bus method to mutually connect a host adaptor as an interface with a host computer, which is a host apparatus, that uses the storage system; a disk adaptor as an interface with storage devices such as magnetic disk devices within the storage system; a cache memory; and a management memory.

When expanding the system configuration of a storage system having the configuration described above, storage system components such as host adaptors, disk adaptors, cache memories and management memories are added. For example, to increase the number of connections with the host computer, new host adaptors are connected to the common bus. Or, to increase the storage capacity of the storage system, storage devices are added. Or, new disk adaptors are connected to the common bus to add storage devices.

In the meantime, another conventional technology proposed a storage system that perform address conversions to correlate a logical storage area that a host computer accesses with a physical storage area that represents the storage area of a storage device, in order to flexibly locate in the storage device the data to be stored. This technology can realize the optimum location of data stored through a means to obtain information concerning I/O access by the host computer to the logical storage area and a means to physically relocate the data by changing the correlation of the logical storage area with the physical storage area.

In the prior art technology described above, due to the fact that any expansion of the storage system involves the addition of storage system components such as host adaptors, disk adaptors, cache memories, management memories and storage devices, the expandability of a storage system is limited by the maximum number of components mountable on the storage system. As a result, when the maximum number of components mountable on a storage system is set at a high number in order to meet demands for large-scale storage systems, the prior art technology encounters such problems as high costs and large housing volume and/or mounting area when a small-scale storage system is required.

Among systems that can solve the problem described above is a clustered storage system. A clustered storage system is configured by connecting a plurality of storage systems such as those described earlier, but is operable as a single storage system by the host computer and is a storage system that can be managed as a single storage system by the user. Small-scale storage systems comprising such clustered storage systems are hereinafter called storage system nodes.

Clustered storage systems can be a clustered storage system comprising a small number of storage system nodes when a small-scale storage system is required, but it can also be a clustered storage system comprising a larger number of storage system nodes when a large-scale storage system is required. Consequently, an optimum cost, housing volume and/or mounting area can be provided for the scale the user requires. In this way, clustered storage systems can accommodate systems in various sizes from small to large. Furthermore, clustered storage systems can have a means by which data stored in one node can be accessed through an interface of a different node. In this way, a clustered storage system is operable as a single storage system by the host computer; this makes the management of the storage system, as well as the entire computer system including the host computer, easy and has the advantage of reduced management cost compared to the management cost for a plurality of storage systems.

In the clustered storage systems as described above, each storage system node has its own resources such as a processor, a memory, a storage device and a cache. Furthermore, each storage system node uses its own resources to perform I/O processing of subordinate storage devices and processing of data stored in other storage devices, which makes the processing and resource management within the node, as well as system configuration planning and/or system management by the system administrator, easy.

However, in the clustered storage systems described above, due to the fact that the clustered storage system itself is operated as a single storage system, a system administrator or a user, or any processing in the host computer, can take into consideration which interface of which node of the clustered storage system to go through to access certain data. However, an administrator cannot ascertain, and therefore cannot take into consideration, which storage device of which node the data is actually stored in and how much of what resources of which node is used to process the data. The consequence of this can be problems described below.

In the clustered storage systems described above, when processing concentrates on certain data stored in a certain storage system node, the available size and/or processing capability of the resources of the node become insufficient; as a result, processor bottleneck, cache overload, reduction in write performance as a result of waiting for reflection of write back cache data onto storage device, reduction in cache hit rate, internal bus bottleneck, and bottleneck due to storage device overload can occur in the node, and these can lead to a reduction in the processing performance of only that particular node.

Furthermore, the clustered storage systems described above have another problem, in which the cache is occupied by the processing of certain data in a node while the cache hit rate for the processing of other data requiring faster response suffers, i.e., the execution of one processing is impeded by another processing, thereby reducing the performance of both.

Moreover, the clustered storage systems described above have yet another problem, in which in spite of the fact that a certain node has ample resources such as a high-speed storage device and a large capacity cache memory, data with high processing priority and requiring high-speed I/O performance is processed in a node with poorer resources such as a slower storage device and a small capacity cache memory and therefore cannot meet the I/O performance required for the data, i.e., a reduction in processing performance due to matching that is not optimum between storage data and resources used.

SUMMARY OF THE INVENTION

The present invention provides a clustered storage system that solves the problems entailed in clustered storage systems that allows administrators such as system administrators, maintenance staff and users to easily recognize the relationship between a logical volume and a node that stores and processes data of the logical volume, that thereby allows the administrators to ascertain and manage the resource usage status of each node, and that consequently allows analysis and investigation to be done efficiently in the event of problems such as a concentration of processing load on a certain node or of usage on a certain resource, which would reduce management costs.

In accordance with the present invention, a clustered storage system that is operable as a single storage system includes a process to allow the system administrator or the user to correlate data, particularly logical volume, stored and used in the clustered storage system with a node that processes the data and to manage such data.

In accordance with the present invention, a clustered storage system includes a process to allow the system administrator or the user to ascertain and manage the resource usage status for each node, as well as a process to caution through warnings in the event of problems such as a concentration of processing load on a certain node or of usage on a certain resource, and that supports the detection, analysis and investigation of such problems.

In accordance with the present invention, a clustered storage system includes a process to realize optimum physical position for data and optimum processing allocation in consideration of the available size, performance and attributes of various resources, by moving the physical position of data stored in the clustered storage system between nodes in a manner transparent to the host computer, by eliminating the concentration of processing load on a certain node or of usage on a certain resource, and by avoiding any impediments between various processing through optimized processing dispersion and locating.

In accordance with an embodiment of the present invention, a clustered storage system in which a plurality of storage systems operates as a single storage system includes: a process that obtains the configuration of resources, as well as at least one of resource size used and resource usage load, of the storage system used in processing data that the storage system has and that is stored in the storage system; a process that presents the relations between address information which is provided by the clustered storage system and resource information of each storage system to a computer that uses the data, and a process that presents resource information based on such relations.

In accordance with another embodiment of the present invention, a control method for a clustered storage system in which a plurality of storage systems operates as a single storage system includes the steps of: obtaining the configuration of resources, as well as at least one of resource size used and resource usage load, of the storage system used in processing data that the storage system has and that is stored in the storage system; presenting the relations between address information which is provided by the clustered storage system and resource information of each storage system to a computer; presenting resource information based on such relations; and relocating the data among the storage systems without having to cease the use of the data by the computer.

In the embodiments described above, a server that manages the clustered storage system is provided, where the server has comprehensive physical position information concerning data in each of the nodes, which are storage systems that comprise the clustered storage system; and where the server has a process to relate the configuration of the clustered storage system to the configuration of each node and to present such relations. Each node has a process to obtain the size and load of resources that are used in processing. The management server has a process to collect and tally the resource usage status from each node, and a process to relate the resource usage status, the data information and the configuration information to each other and to present the relations in hierarchy. The clustered storage system has a process to move stored data among nodes while online and in a manner transparent to the host computer; the management server has a process to support the selection of source data and destination physical position through the information displayed, and a process to receive instructions for such move and to direct the clustered storage system of the move.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

Figure 1:
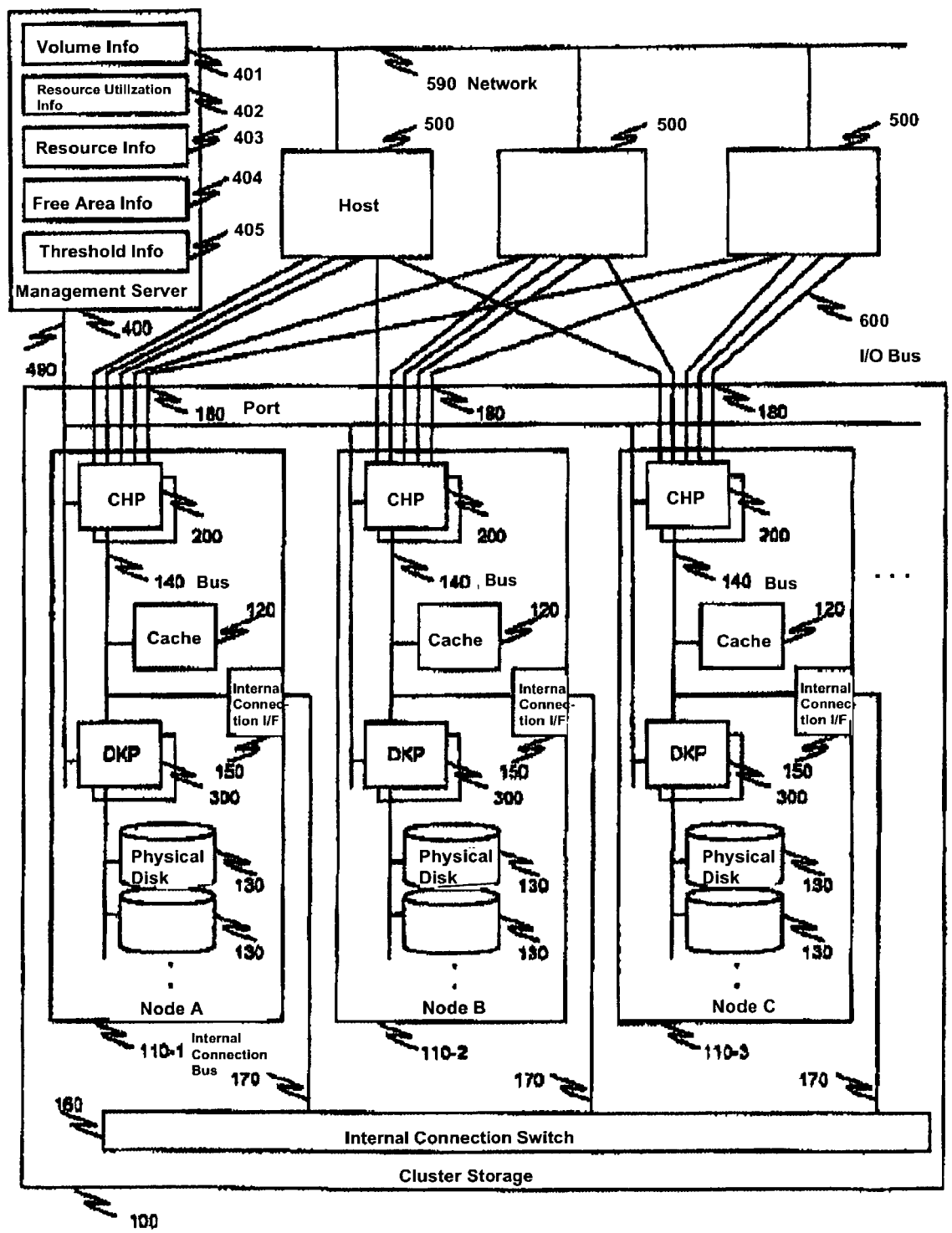

Brief Description of Drawings:

FIG. 1 shows a block diagram illustrating the configuration of a computer system that uses a clustered storage system in accordance with one embodiment of the present invention.

Figure 2:
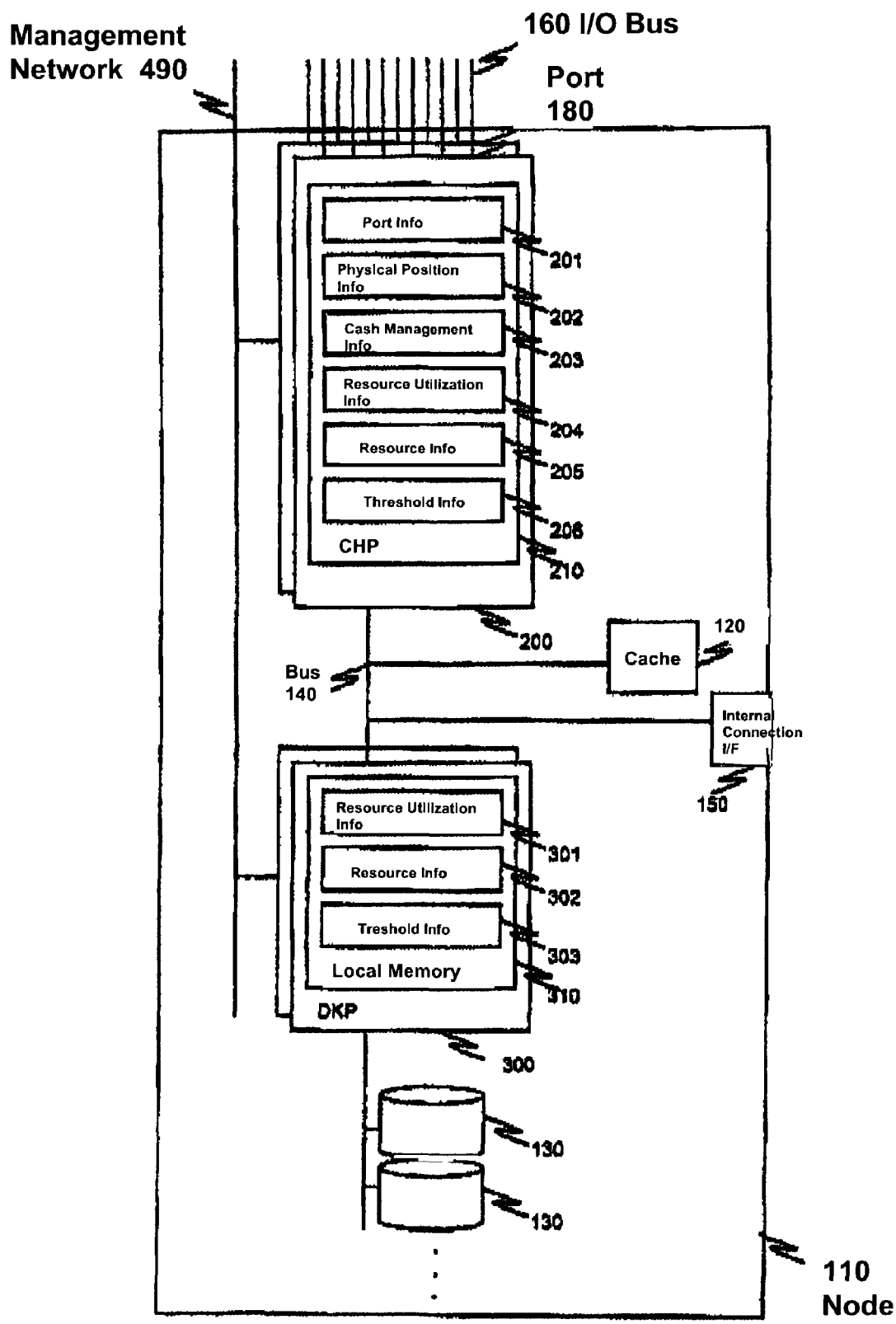

FIG. 2 shows a block diagram illustrating the configuration of a node in FIG. 1.

FIG. 3 shows a table describing an example of port information.

FIG. 4 shows a table describing an example of physical position information.

FIG. 5 shows a table describing an example of cache management information.

Figure 6:
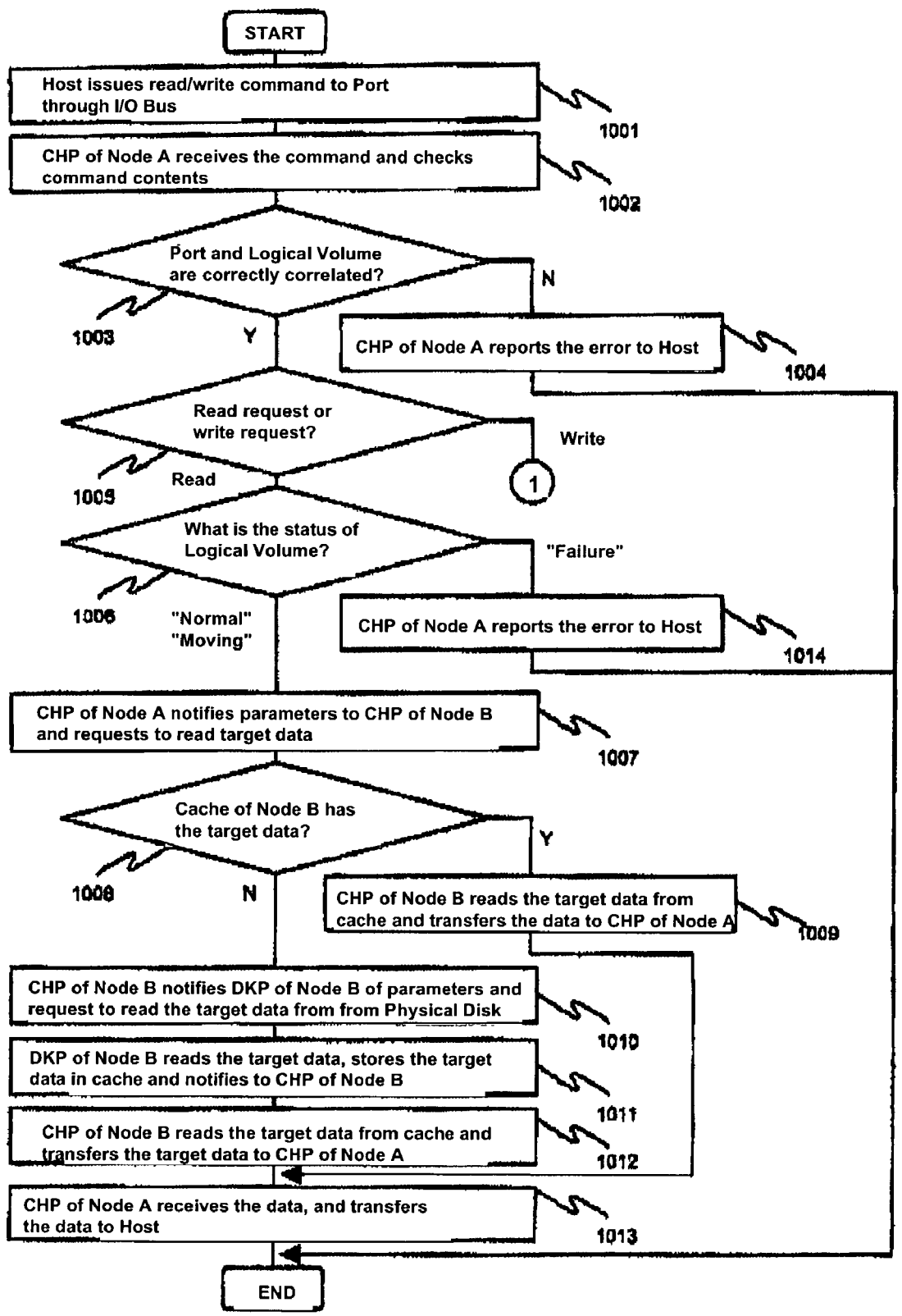

FIG. 6 shows a flowchart describing the processing operation that takes place for the host to read/write onto a logical volume.

Figures 7, 8:
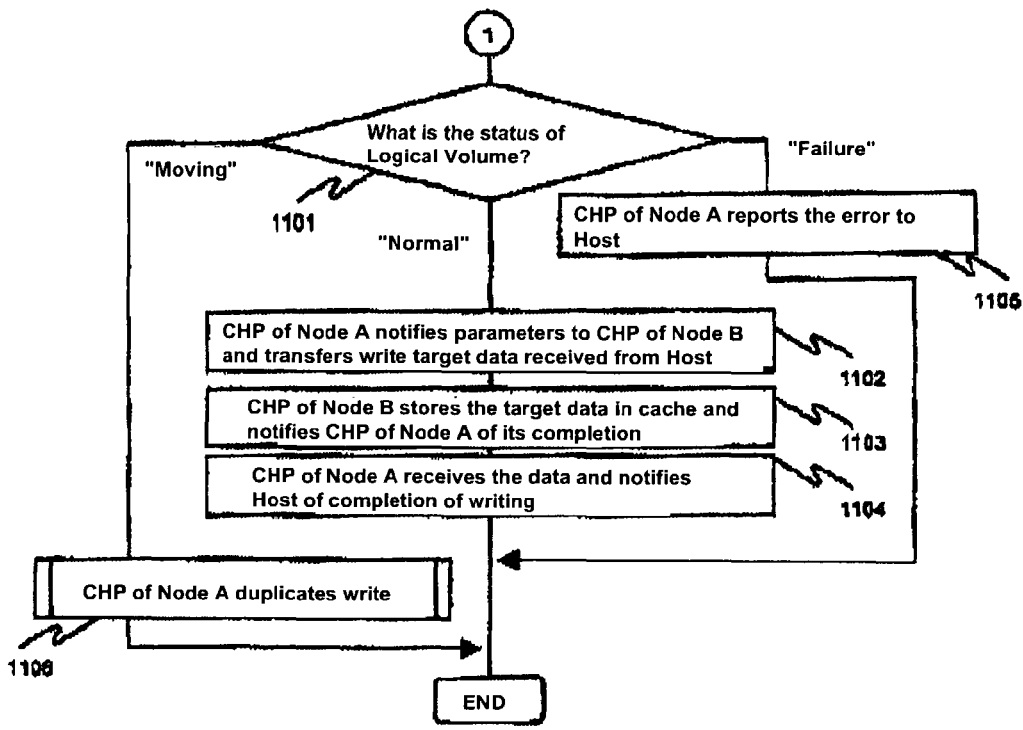

FIG. 7 shows a flowchart describing the processing operation that takes place for the host to write onto a logical volume.

FIG. 8 shows a table describing an example of a CHP's resource usage information.

FIG. 9 shows a table describing an example of a DKP's resource usage information.

FIG. 10 shows a table describing an example of volume information that a management server has.

Figures 11, 12:
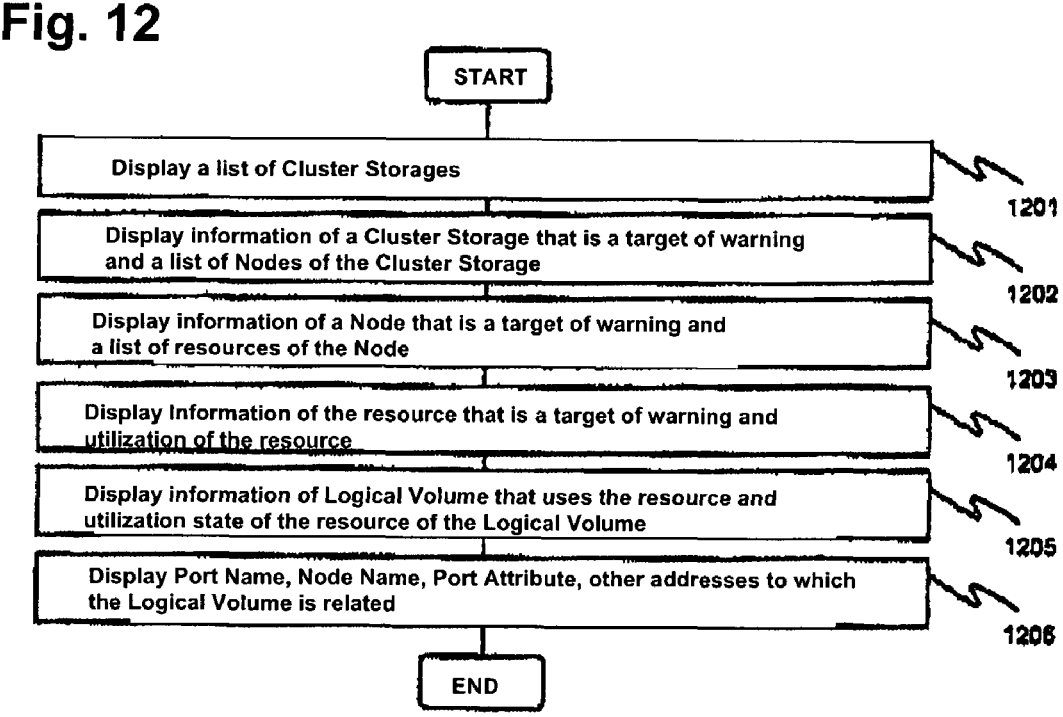

FIG. 11 shows a table describing an example of free area information that the management server has.

FIG. 12 shows a flowchart of the first procedure that describes the processing and operations performed by the management server to collect and display resource usage information.

Figure 13:
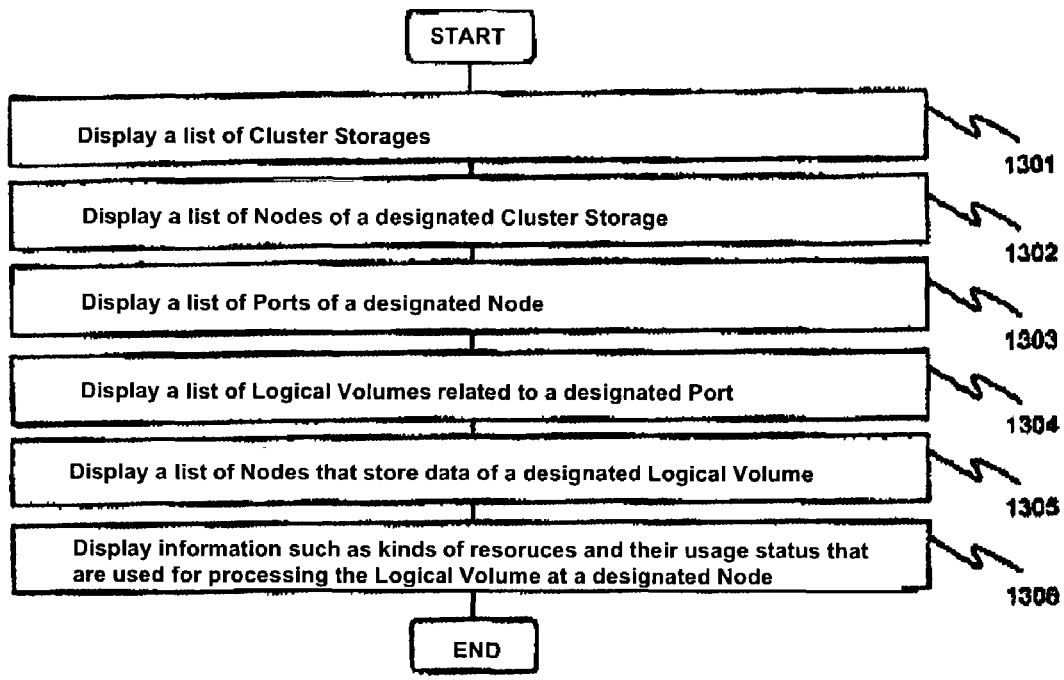

FIG. 13 shows a flowchart of the second procedure that describes the processing and operations performed by the management server to collect and display resource usage information.

Figure 14:
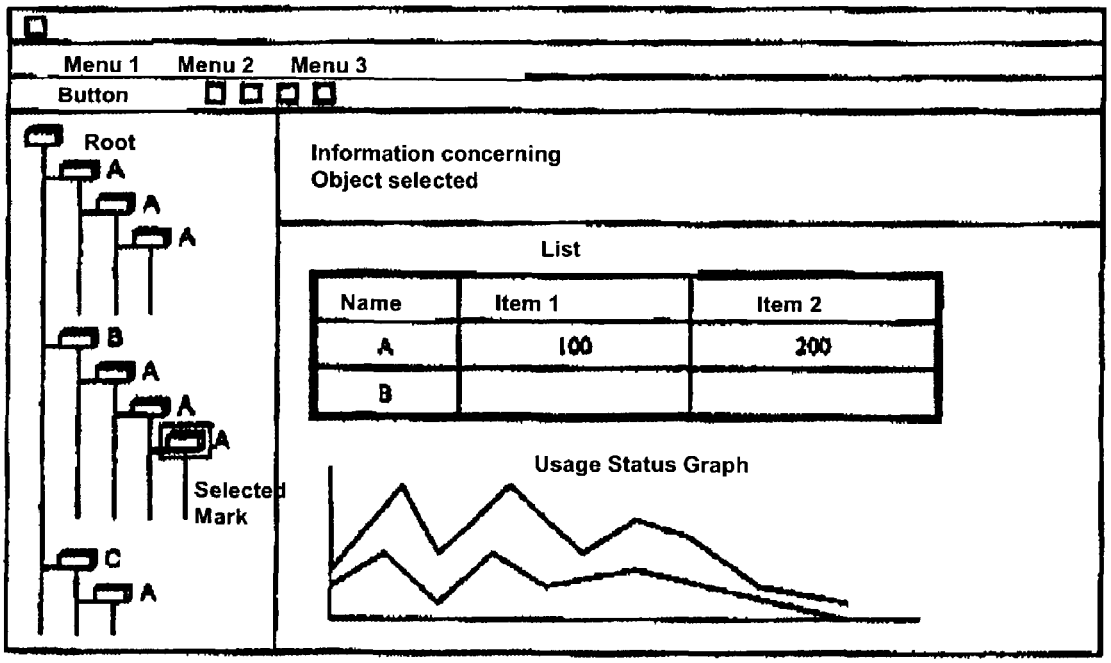

FIG. 14 shows a screen example of information displayed in accordance with the procedures in FIGS. 12 and 13.

Figure 15:
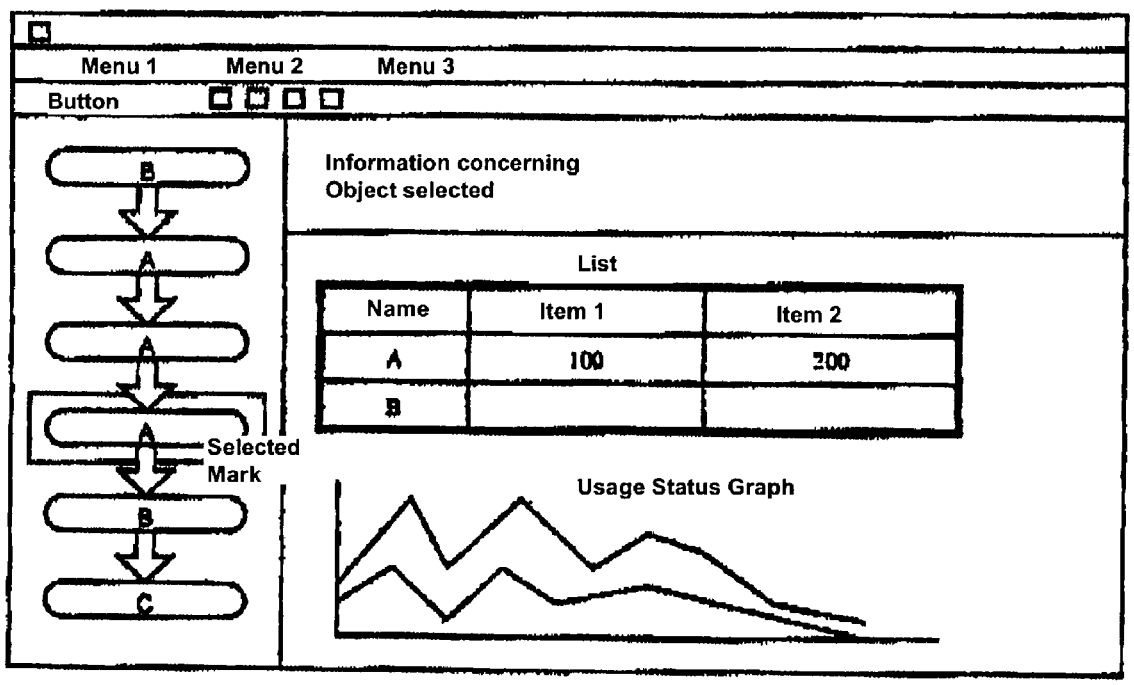

FIG. 15 shows another screen example of information displayed in accordance with the first procedure in FIG. 12.

Figure 16:
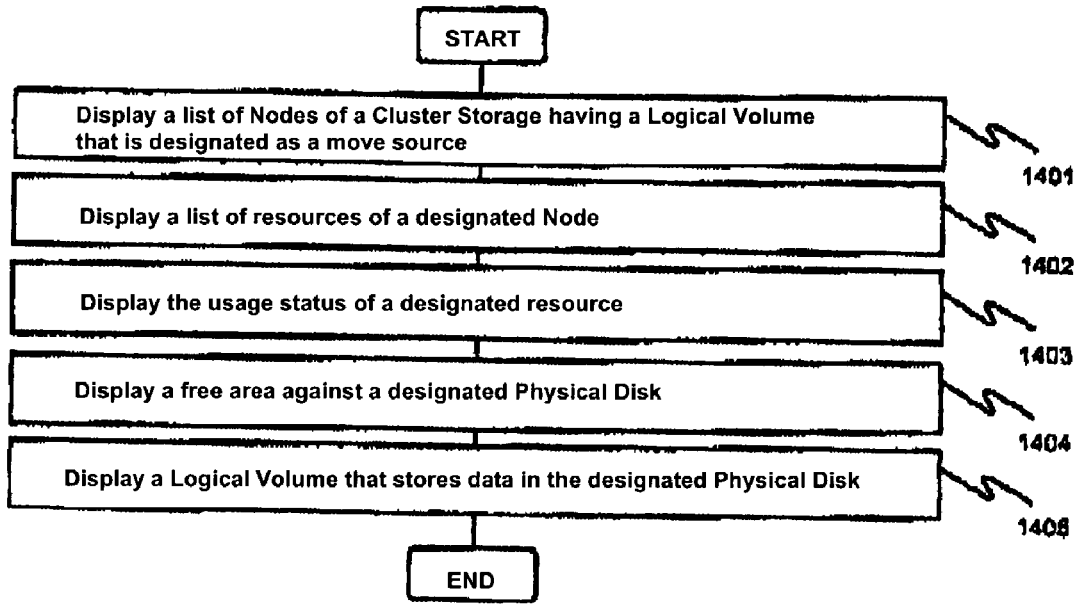

FIG. 16 shows a flowchart describing the procedure to select a destination.

Figure 17:
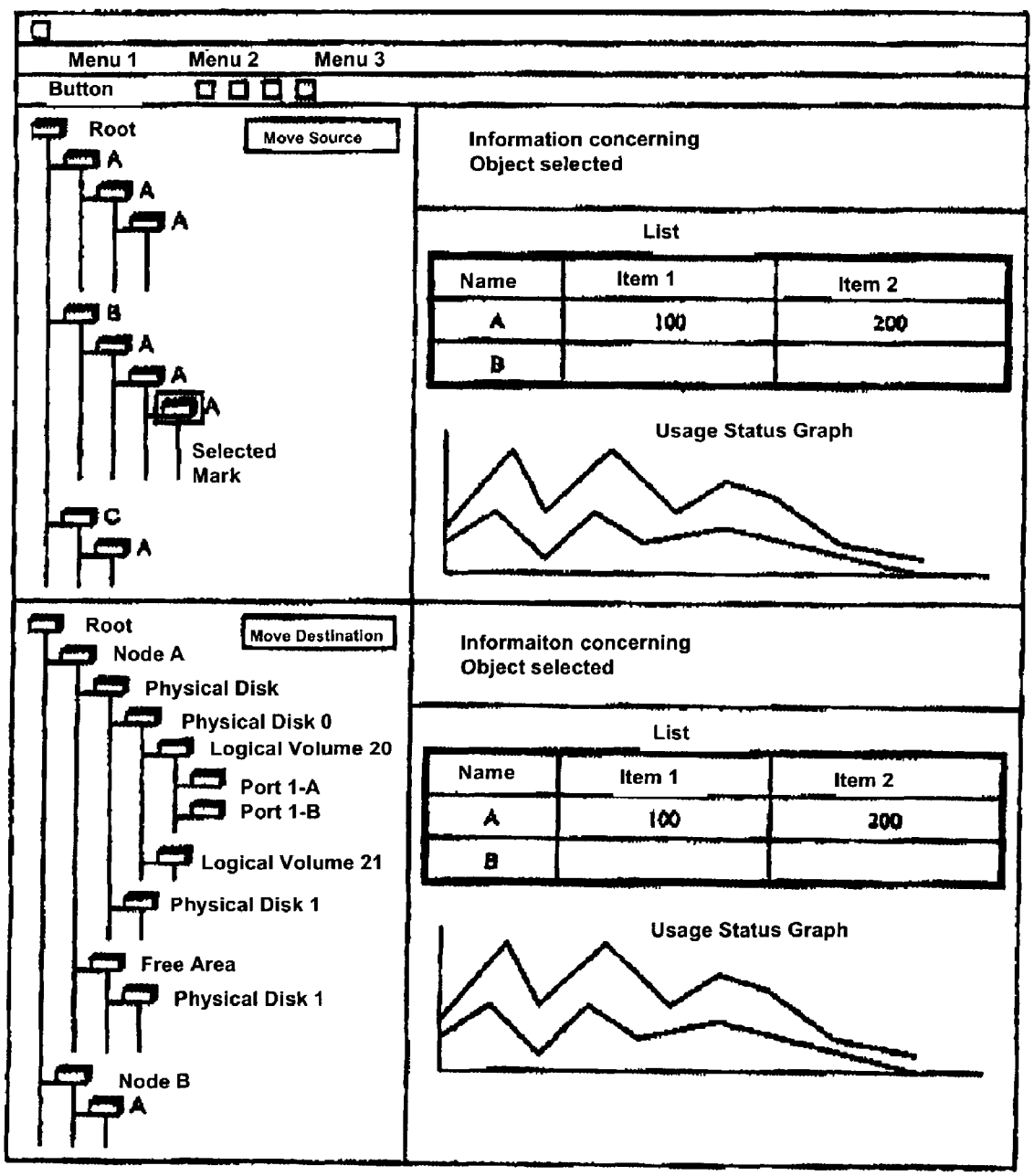

FIG. 17 shows a screen example displayed in accordance with the procedure described in FIG. 16 and by which the administrator determines the destination.

Figure 18:
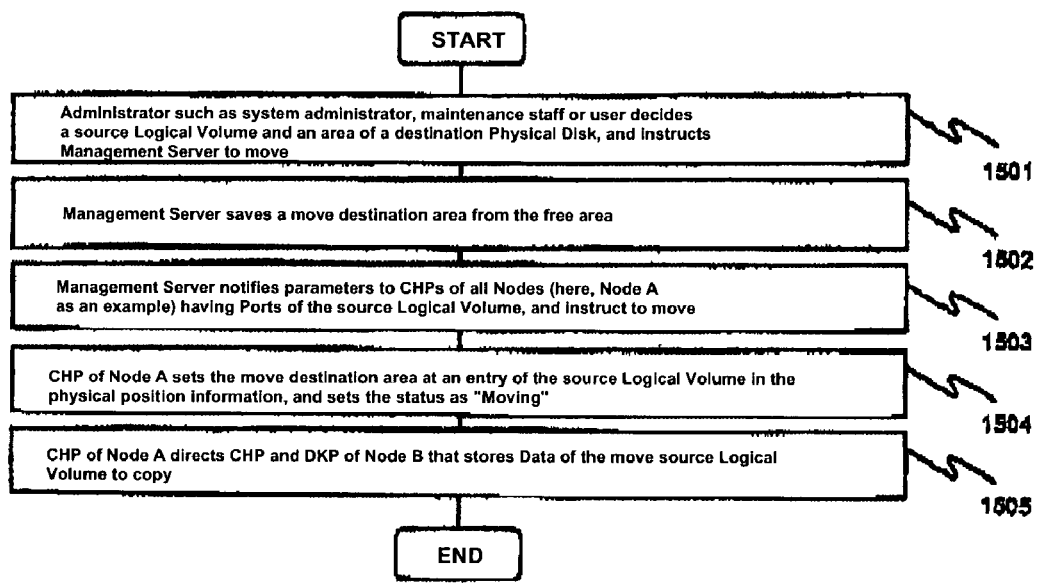

FIG. 18 shows a flowchart describing the processing operation to direct data copying.

Figure 19:
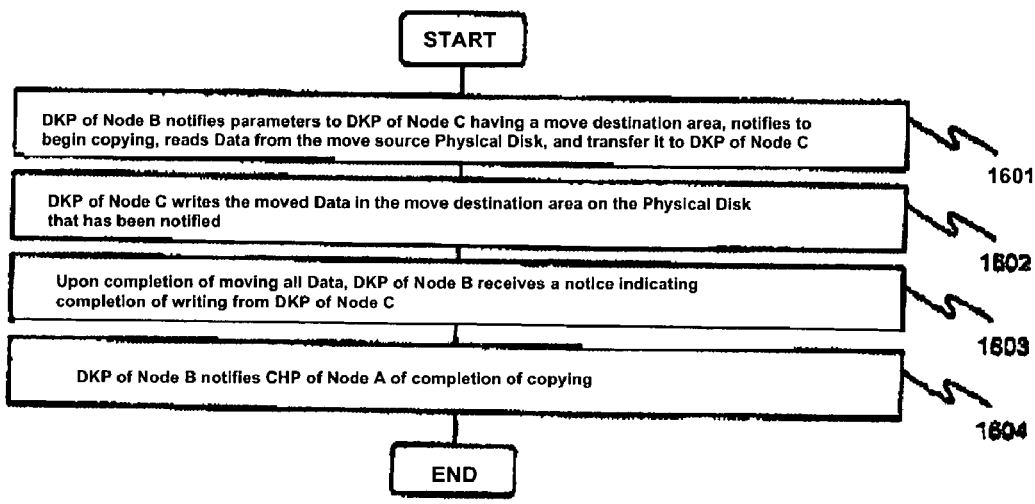

FIG. 19 shows a flowchart describing the processing operation for data copying performed by the DKPs 300 of the node B 110-2 and the node C 110-3.

Figure 20:
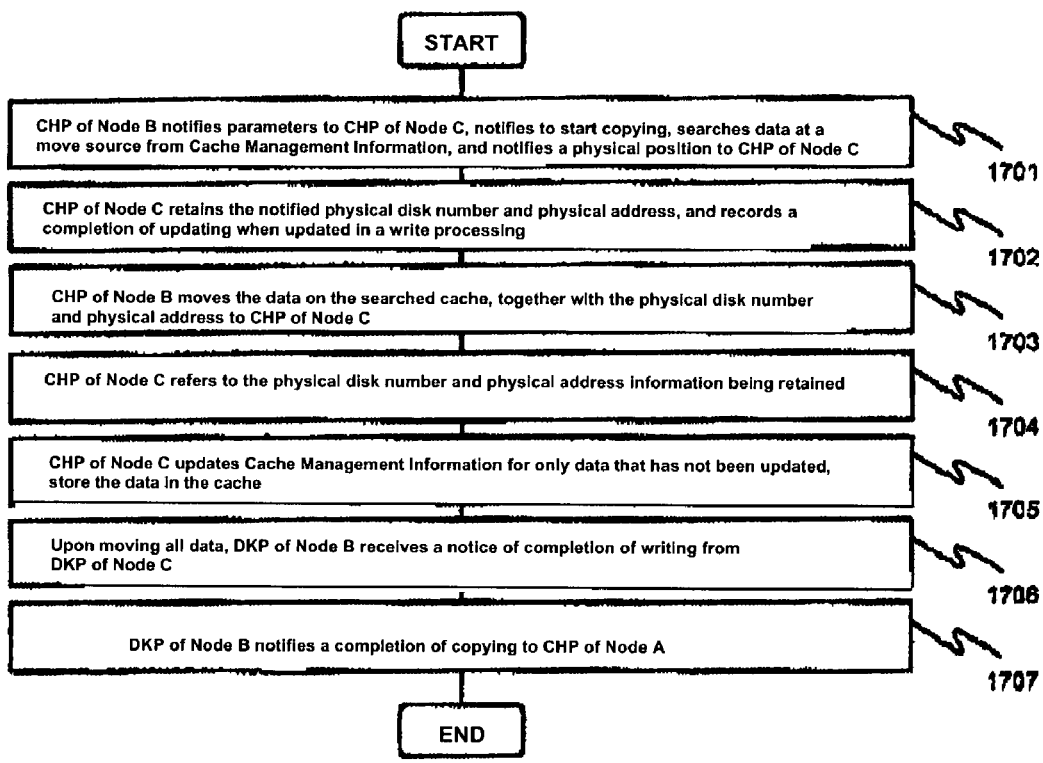

FIG. 20 shows a flowchart describing the processing operation for data copying performed by the CHPs 200 of the node B 110-2 and the node C 110-3.

Figure 21:
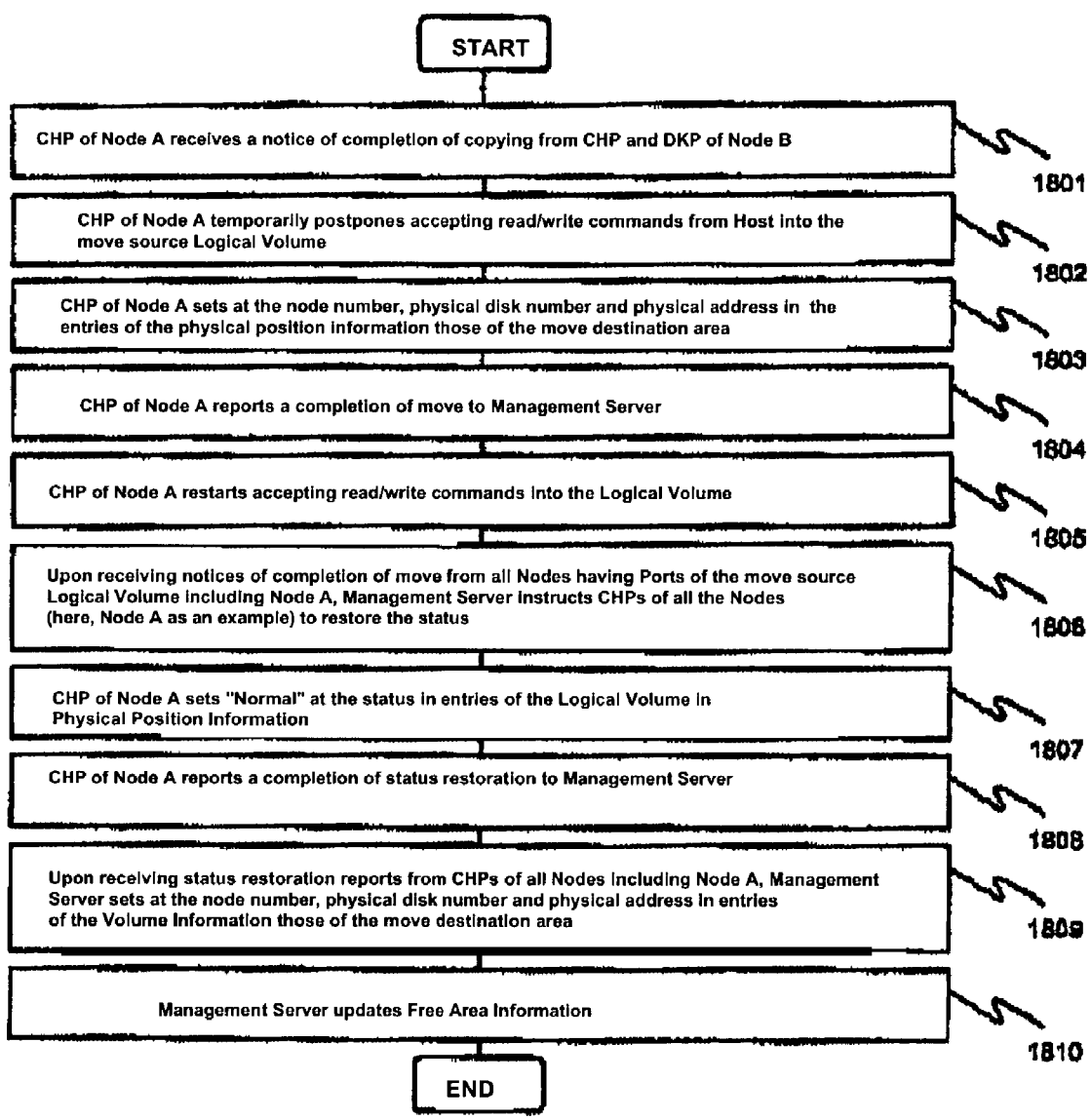

FIG. 21 shows a flowchart describing the processing operation to update physical position information in the CHP 200.

PREFERRED EMBODIMENT

An embodiment of a clustered storage system according to the present invention is described in detail below with reference to the accompanying drawings.

FIG. 1 is a block diagram showing the configuration of a computer system that uses a clustered storage system according to one embodiment of the present invention, and FIG. 2 is a block diagram showing the configuration of a node in FIG. 1. In FIGS. 1 and 2, 100 is a clustered storage; 110 (110-1 through 110-3) is a node; 120 is a cache; 130 is a physical disk; 140 is a bus; 150 is an internal connection interface (I/F); 160 is an internal connection switch; 170 is an internal connection bus; 180 is a port; 200 is a channel processor (CHP); 201 is port information; 202 is physical position information; 203 is cache management information; 204, 301 and 402 are resource usage information; 205, 302 and 403 are resource information; 206, 310 and 405 are threshold information; 210 and 310 are local memories; 300 is a disk processor (DKP); 400 is a management server; 401 is volume information; 404 is free area information; 490 is a management network; 500 is a host; 590 is a network; and 600 is an I/O path.

The computer system shown in FIG. 1 comprises the clustered storage 100, which is a clustered storage system, the management server 400 and one or more hosts 500. The clustered storage 100 comprises a plurality of nodes 110. Each node 110 functions as a single storage system and is equipped with the CHP 200, the cache 120, the DKP 300, one or more physical disks 130 and the internal connection I/F 150, where such components are mutually connected by the bus 140. Each of the nodes 110 in the clustered storage 100 is connected to each other by the internal connection buses 170 via the internal connection I/Fs 150 and the internal connection switch 160. The hosts 500 are connected via the I/O paths 600 to the ports 180, which are provided by the CHPs 200 in the clustered storage 100.

Some examples of protocols and standards used by the I/O paths 600 are fibre channels (FCs), IPs, and Infini bands. The management server 400 and the hosts 500 are connected by the network 590. The management server 400 is connected to the CHPs 200 and the DKPs 300 by the management network 490. An example of protocols and standards used by the management network 490 and/or the network 590 is IPs.

Although each of the CHPs 200, DKPs 300, the management server 400 and the hosts 500 has components such as memories and CPUs used for processing that are always found in computers, they are not necessarily stated in the following description in order to simplify the description.

The physical disks 130 are storage devices such as magnetic disks that number one or more in each node 110, and their function is to store or regenerate data used by the hosts 500. Each physical disk 130 may be a single magnetic disk or it may have a configuration with redundancy added through striping, parity or mirror, which are known as RAID. The CHPs 200 configure logical volumes from the storage area of the physical disks 130 based on the physical position information 202, which is described later, and provide the logical volumes as virtual storage devices to the hosts 500. In providing the logical volumes, the CHPs 200 relate the logical volumes to the ports 180, and the hosts 500 access the logical volumes via the ports 180.

In general, in addition to the port 180, the CHPs 200 relate to each logical volume an address on one of the I/O paths 600, such as a target ID in the port 180 and a logical unit number, while the hosts 500 access the logical volume by designating the address; however, in the following, the description of these are omitted in order to simplify the description and we shall assume that the port information 201 and the volume information 401 contain information concerning the address and that the CHPs 200 and the management server 400 use the address contained in such information to perform their respective processing. A plurality of ports 180 and addresses may be related to one logical volume.

The computer system shown in FIG. 1 indicates only one clustered storage, but the present invention can be comprised of a plurality of clustered storages managed by one management server. Furthermore, there can be more nodes provided within one clustered storage. Moreover, the number of I/O paths that connect each host with each CHP in each node can be any number and need not be limited by the example shown in the figure.

Each node 110 has in its CHP 200, as shown in FIG. 2, the local memory 210, which stores the port information 201, the physical position information 202, the cache management information 203, the resource usage information 204, the resource information 205 and the threshold information 206; and in its DKP 300 the local memory 310, which stores the resource usage information 301, the resource information 302 and the threshold information 303.

FIG. 3 is a table that describes an example of the port information 201, FIG. 4 is a table that describes an example of the physical position information 202, and FIG. 5 is a table that describes an example of the cache management information 203; next, we will describe these pieces of information stored in the local memory 210 of each CHP 200.

The port information 201 comprises a logical volume number and a port number as a pair, as shown in FIG. 3. The logical number is a number that indicates a logical volume and each logical volume number is unique within one clustered storage 100. The port number is a number that indicates the port 180 to which the logical volume is related.

As FIG. 4 shows, the physical position information 202 comprises the logical volume number, a node number, a physical disk number, a physical address, capacity, a destination node number, a destination physical disk number, a destination physical address and status. In FIG. 4, the logical volume number is the same number as in FIG. 3 that was described in relation to the port information 201. The node number is a number that indicates the node in which the physical disk 130 that stores data of the logical volume exists. The physical disk number is a number that indicates the physical disk 130. The physical address is an address that indicates the starting position of a storage area of the data of the logical volume on the physical disk 130. The capacity is a value that indicates the size of the storage area on the physical disk 130. The destination node number, the destination physical disk number and the destination physical address are information that indicates the destination of the move processing of the logical volume, which is described later. The status indicates the status of the logical volume, where "normal" indicates that the logical volume can be used, "failure" indicates that it cannot be used, and "moving" indicates that the move processing described later is being executed.

When there is a plurality of entries for the node number, the physical disk number, the physical address and the capacity for one logical volume number in the physical position information 202 described above, it indicates that one logical volume comprises a plurality of storage areas; and in the example in FIG. 4, the various storage areas are indicated to be linked in sequence from the top. Entries for the logical volume in the port information 201 and the physical position information 202 are entries for the logical volume for which the CHP 200 that retains these pieces of information receives read/write commands, where the physical position information 202 is updated by the configuration (generation)/release (deletion) of the logical volume, and the port information 201 is updated by the establishing/releasing of relations between the logical volume and the ports 180.

As FIG. 5 shows, the cache management information 203 comprises the physical disk number, the physical address, a memory address and a dirty flag. In FIG. 5, the physical disk number and the physical address indicate the physical disk 130 and its storage area (a segment comprising a set length) that are to store the data that is currently stored in the cache 120. The memory address indicates an address of the data in the cache 120. The dirty flag indicates whether the data has been reflected on the physical disk 130 or not reflected (dirty). Entries for the cache management information 203 correspond to the physical disk 130 of the node 110 in which the cache management information 203 exists, and the entries are updated when an area is allocated in the cache 120 and data is stored there, or when data stored in the cache 120 is written on the physical disk 130 due to a shortage of the area in the cache 120 and the area is therefore released. The cache management information 203 can generally be searched at high-speed using, for example, hash tables; and entries marked dirty by the dirty flag, i.e., data not reflected on the physical disk 130, can be searched at high-speed using a list structure.

FIGS. 6 and 7 are flowcharts that describe the processing operations that take place when one of the hosts 500 reads/writes onto the logical volume, and we will next describe, using the flowcharts in FIGS. 6 and 7, the processing that takes place when one of the hosts 500 accesses (reads/writes) the logical volume provided by the clustered storage 100. In read/write processing, the port information 201, the physical position information 202 and the cache management information 203 are used.

(1) One of the hosts 500 issues via the I/O path 160 a read command or a write command to the port 180 to which the logical volume, which is the access target, is related (step 1001).

(2) The CHP 200 (the CHP 200 of the node A 110-1 in this case) that provides the port 180 receives via the port 180 the read/write command from the host 500 and obtains the access target's logical volume and address, read/write request classification and read/write length (step 1002).

(3) The CHP 200 of the node A 110-1 uses the port information 201 to check whether the port 180 receiving the command and the logical volume that is the access target are correctly related; if they are not correctly related, the CHP 200 reports the error to the host 500 and terminates the processing (steps 1003 and 1004).

(4) If as a result of checking in step 1003 the port 180 receiving the command and the logical volume that is the access target are found to be correctly related, the CHP 200 of the node A 110-1 discriminates the read/write request classification; and if the request is a read request, the CHP 200 refers to the physical position information 202 to check the status of the logical volume; if the status is not "normal" or "moving" but "failure," the CHP 200 reports the error to the host 500 and terminates the processing (steps 1005, 1006 and 1014).

(5) If as a result of checking in step 1006 the status is found to be "normal" or "moving," the CHP 200 of the node A 110-1 refers to the node number, the physical disk number and the physical address of the entries for the logical volume in the physical position information 202 to obtain the node number, the physical disk number and the physical address in which the logical volume exists, and notifies, via the internal connection bus 170, the CHP (the CHP 200 of the node B 110-2 in this case), in which the logical volume exists, of the physical disk number, read target address and read length to request read target data (step 1007).

(6) The CHP 200 of the node B 110-2 that received the request refers to its cache management information 203 and checks whether the target data exists in the cache 120 of the node B 110-2; if it exists, the CHP 200 updates the cache hit rate of the resource usage information 204, which is described later, and transfers the target data from the cache 120 of the node B 110-2 to the CHP 200 of the node A 110-1 via the bus 140 (steps 1008 and 1009).

(7) If as a result of checking in step 1008 the target data is found not to exist in the cache 120 of the node B 110-2, the CHP 200 of the node B 110-2 notifies the DKP 300 of the node B 110-2 via the bus 140 of the physical disk number, the read target address and the read length, and requests the target data to be read onto the cache 120 (step 1010).

(8) The DKP 300 of the node B 110-2 that received the request reads the target data from the physical disk 130 that was notified, stores the data in the cache 120, updates the cache management information 203, and notifies the CHP 200 of the node B 110-2 via the bus 140 of the completion of read. In this processing, the DKP 300 can exclusively refer to and update the cache management information 203 of the CHP 200 via the bus 140. In other words, the cache management information 203 is information shared by the CHP 200 and the DKP 300 (step 1011).

(9) The CHP 200 of the node B 110-2 that received the notice refers to the cache management information 203, reads the target data from the cache 120, transfers the target data to the CHP 200 of the node A 110-1 via the internal connection bus 170, and updates the cache hit rate of the resource usage information 204, which is described later (step 1012).

(10) After the processing in step 1012 or the processing in step 1009, the CHP 200 of the node A 110-1 that received the target data transfers the target data to the host 500 via the I/O path 160, notifies of the completion of read, and terminates the read processing (step 1013).

(11) If as a result of checking in step 1005 the request from the host 500 is found to be a write request, the CHP 200 of the node A 110-1 refers to the physical position information 202 and checks the status of the logical volume that is the write target (step 1101).

(12) If as a result of checking in step 1101 the status is found to be "normal," the CHP 200 of the node A 110-1 obtains from the physical position information 202 the node number, the physical disk number and the physical address in which the logical volume exists; notifies the physical disk number, write target address and write length to the CHP (the CHP 200 of the node B 110-2 in this case) of the node in which the logical volume exists, while at same time notifying the start of write target data transfer; receives the target data from the host 500; and transfers the target data to the CHP 200 of the node B 110-2 via the internal connection bus 170 (step 1102).

(13) The CHP 200 of the node B 110-2 that was notified receives the target data, stores the data in the cache 120, updates the cache management information 203, sets the dirty flag of the cache management information 203 to dirty, and notifies the completion of write to the CHP 200 of the node A 110-1. The cache 120's fault tolerance is secured through non-volatilization by battery backup and/or duplication (step 1103).

(14) The CHP 200 of the node A 110-1 that was notified in turn notifies the completion of write to the host 500 and terminates the write processing (step 1104).

(15) If as a result of checking in step 1101 the status is found to be "failure," the CHP 200 of the node A 110-1 notifies a write failure to the host 500 and terminates the write processing. If the status is "moving," the write processing is duplicated and terminated, as described later (steps 1105 and 1106).

The DKP 300 of the node B 110-2 refers asynchronously to the cache management information 203, searches for data whose dirty flag is set to dirty, writes the dirty data onto the physical disk 130 and sets the dirty flag to indicate that the data has been reflected. Through this processing, the write target data is stored on the physical disk 130.

When one logical volume comprises a plurality of storage areas on the physical disks 130, the CHP 200 of the node A 110-1 performs the processing described above on each of the storage areas involved. For example, if the storage areas are in a plurality of nodes 110, the CHP 200 of the node A 110-1 requests each node 110 to perform the processing, and proceeds with the read/write processing once it is notified of processing results from each node 110.

In the processing described above, each CHP 200 and each DKP 300 measure the information concerning the usage status of resources used in the processing and record such information in the resource usage information 204 of the CHP 200 and the resource usage information 301 of the DKP 300, respectively.

FIG. 8 is a table that describes an example of the resource usage information 204, and FIG. 9 is a table that describes an example of the resource usage information 301 of the DKP 300; we will describe these next.

As shown in FIG. 8, the resource usage information 204 comprises information concerning the cache used (MB), cache transfer rate (MB/sec), cache hit rate (%), processor utilization of each of the processors 1 and 2, bus utilization (%), bus transfer rate (MB/sec) and memory used (MB) for each logical volume number as well as for the whole. In the resource usage information 204 thus comprised, the cache used is the amount of the cache 120 used and this figure increases as data is stored through write processing. The cache used also increases by having resident data in cache 120. The cache transfer rate is the inflow and outflow per unit time in the cache 120 and its unit is MB/sec. The cache hit rate is calculated by the number of commands hit divided by the total number of commands. The processor utilization is the amount of time the CHP's processor has been used per unit time. The bus utilization is the amount of time the bus 140 has been used per unit time. The bus transfer rate is the inflow and outflow per unit time in the bus 140 and its unit is MB/sec. The memory used is the amount of the CHP's local memory used. Each CHP 200 tallies two types of values for each piece of information shown in FIG. 8: one for each logical volume and one as a sum of those values. The amount of each resource used in the processing of a particular logical volume is tallied as a value related to the logical volume.

As one example shown in FIG. 9 indicates, the resource usage information 301 of the DKPs 300 comprises information concerning the processor utilization, the bus utilization (%), the bus transfer rate (MB/sec), the memory used (MB) and the disk utilization for each logical volume number as well as for the whole. The processor utilization, the bus utilization, the bus transfer rate and the memory used are the same as those described in the example of the resource usage information 204. The disk utilization is the amount of time the physical disk 130 has been used per unit time and is expressed as the utilization of sequential read (%), sequential write (%), random read (%), random write (%) and total (%) for each physical disk number.

Each DKP 300 tallies the disk utilization for each read/write classification and each sequential/random access classification in the read/write processing described earlier. Each DKP 300 tallies two types of values, one for each logical volume and one for their sum, as the CHPs 200 do, for the values described above; however, each DKP 300 also tallies the disk utilization for each physical disk 130. The physical disk number is a number assigned to the physical disk 130 that the logical volume in question or the whole uses.

If any of the results tallied in the resource usage information 204 exceeds the threshold for usage status of each resource set in advance in the threshold information 206, the relevant CHP 200 warns the management server 400 via the management network 490. Similarly, if any of the results tallied in the resource usage status 301 exceeds the threshold for usage status of each resource set in advance in the threshold information 303, the relevant DKP 300 warns the management server 400 via the management network 490. Based on these, each CHP 200 and each DKP 300 can detect excessive processing load for resources of its respective node 110, such as the processor, the cache 120, the memory, the bus 140, and the physical disks 130. The threshold information 206 and the threshold information 303 are set by the system administrator, maintenance staff or the user, but they can also be set directly in the clustered storage 100, or they can be set via the management server 400. By setting similar thresholds in each of the nodes 110, any concentration of load on a particular node can be detected.

FIG. 10 is a table that describes an example of the volume information 401 that the management server 400 has, and FIG. 11 is a table that describes an example of the free area information 404 that the management server 400 has; we will describe these next.

The management server 400 has the volume information 401, the resource usage information 402, the resource information 403, the free area information 404 and the threshold information 405; when the computer system initializes or when its configuration changes, the management server 400 collects the port information 201, the physical position information 202 and information concerning free area of the physical disks 130 from the CHP 200 of each node 110, and uses them to create the volume information 401 and the free area information 404.

As one example shown in FIG. 10 indicates, the volume information 401 comprises information concerning the logical volume number, the port number, the port node number, the node number, the physical disk number, the physical address and capacity. The logical volume number is a number that indicates the logical volume and it is the same number as the logical volume number in the physical position information 202 of each node 110. The port number is a number that indicates the port to which the logical volume is related and it is the same number as the port number in the port information 201. The port node number is a number that indicates the node 110 in which the port exists. The node number, the physical disk number, the physical address and the capacity are the same as the node number, the physical disk number, the physical address and the capacity in the physical position information 202.

As one example shown in FIG. 11 indicates, the free area information 404 indicates the storage area not in use on each of the physical disks 130 in each node 110 and is expressed by information concerning the node number, the physical disk number, the physical address and capacity; the management server 400 can search for free area within the storage area in each node 110 by using the free area information 404.

The management server 400 collects via the management network 490 the resource usage information 204 and the resource usage information 301 from each CHP 200 and each DKP 300, respectively, and uses them to tally the resource usage information 402. The resource usage information 402 is a set of the resource usage information 204 and the resource usage information 301 of each node, i.e., it is managed by attaching a node number to the resource usage information 204 and the resource usage information 301 described earlier. The management server 400 records the history of usage status of various resources of the clustered storage 100 by chronologically accumulating and retaining the resource usage information 402. Such chronological retention can be done by having the management server 400 collect and accumulate the resource usage information 204 and the resource usage information 301 per unit time from each CHP 200 and each DKP 300, respectively, or it can be done by having each CHP 200 and each DKP 300 chronologically accumulate the resource usage information 204 and the resource usage information 301, respectively, and having the management server 400 collect such accumulated information.

Further, the management server 400 collects via the management network 490 the resource information 205 and the resource information 302 from each CHP 200 and each DKP 300, respectively, to create the resource information 403. Some examples of the content of the resource information 205 that each CHP 200 has are the following: the capacity of the cache 120, the maximum transfer speed of the cache 120, the maximum transfer speed of the bus 140 and the capacity of the local memory of the CHP 200. Some examples of the content of the resource information 302 that each DKP 300 has are the following: the maximum transfer speed distribution of each physical disk 130 based on the model name, capacity, maximum transfer speed and physical address of the physical disk 130; the average rotational delay of each physical disk 130; the maximum transfer speed of the bus 140; and the capacity of local memory of the DKP 300. The resource information 403 that the management server 400 has is a set of the resource information 205 and the resource information 302, and the management server 400 can use the resource information 403 to evaluate the content of the resource usage information 402 from the perspective of the degree and ratio of load. In order to maintain correlation between the resource usage information 402 and the resource information 403, the management server 400 retains history also for the resource information 403.

By comparing the thresholds for the usage status of various resources as set in advance by the system administrator, maintenance staff or the user in the threshold information 405 with the results tallied in the resource usage information 402, the management server 400 can detect any excessive processing load on various resources of each node 110, such as the processor, the cache 120, the memory, the bus 140 and the physical disks 130.

Next, we will describe how the management server 400 presents information to the system administrator, maintenance staff or the user for the purpose of analyzing reduced performance detected or the cause of reduced performance in the clustered storage 100. Using the information provided by the management server 400 through screen displays, the administrator can investigate reduced performance and the cause of such reduced performance in the clustered storage 100, especially concentration of load on a specific node 110 or concentration of usage on certain resources. The management server 400 presents information according to the following two types of procedure by which the administrator, whether the system administrator, maintenance staff or the user, conducts his or her investigation.

FIG. 12 is a flowchart of the first procedure that describes the processing and operations that the management server 400 performs to collect and display resource usage information; first we will describe the first procedure with reference to FIG. 12. The first procedure is a procedure in response to warnings of excessive resource usage in any of the nodes 110 and such warnings by the management server 400.

(1) Based on an instruction from the administrator, as a first step in a means to present information through screen display the management server 400 displays a list of name or names of one or more clustered storages 100 that the management server 400 manages (step 1201).

(2) As the next step, the management server 400 displays information such as the name and properties of the clustered storage 100 that is the target of warning from among the clustered storages 100, as well as a list of names of a plurality of nodes 110 that comprise the clustered storage 100 in question (step 1202).

(3) As the next step, the management server 400 displays information such as the name and properties of the node 110 that is the target of warning from among the plurality of nodes 110, as well as a list of classifications and names of various resources that the node 110 in question has (step 1203).

(4) As the next step, the management server 400 displays information such as the name and properties of the resource that is the target of warning from among the various resources, as well as the usage status of the resource in question. Such display information is information concerning the resource from the resource usage information 402 and the resource information 403, as well as values derived from calculations based on such information; for example, if the resource in question is the cache 120, information such as its name, capacity, maximum transfer speed, amount used, utilization (amount used/capacity) and transfer rate is included; while if the resource in question is one of the physical disks 130, information such as its name, model name, capacity, maximum transfer speed, maximum transfer speed distribution, average rotational delay, utilization (for each access classification) is included (step 1204).

(5) As the next step, in relation to the information displayed, the management server 400 uses the volume information 401 and the resource usage information 402 to display logical volumes that use the resource in question, as well as the resource usage status for each logical volume. Through this, the administrator can find out the amount of resources being used for the processing of each logical volume (step 1205).

(6) As the next step, the management server 400 displays information such as the name, attribute, properties and node of each port 180 to which the logical volumes are related, based on the volume information 401 (step 1206).

Through displays as described above, the administrator can link the logical volumes that use the resource in question to such information as the port names to which the logical volumes are related, node names, attribute of the ports 180 and addresses, which is general information about the configuration of the computer system shown in FIG. 1 as well as general information in the host 500's use of logical volumes of the clustered storage 100. By linking the two, the administrator can ascertain the processing load and resource usage status relevant to the logical volumes, so that, for example, the administrator can compare his or her findings against the performance of the logical volumes as measured by the host 500.

FIG. 13 is a flowchart of the second procedure that describes the processing operations that the management server 400 performs to collect and display resource usage information; next we will describe the second procedure as we refer to FIG. 13. The second procedure is a procedure that the system administrator, maintenance staff or the user follows to investigate a specific logical volume due to reduced performance that has been detected. The administrator begins the investigation based on information such as the port names, node names and attributes of the ports 180 regarding the logical volume.

(1) Based on an instruction from the administrator, as a first step in a means to present information through screen display the management server 400 displays a list of name or names of one or more clustered storages 100 that the management server 400 manages (step 1301).

(2) When the administrator designates the clustered storage 100 in which the logical volume in question exists, the management server 400 as the next step displays a list of names of a plurality of nodes 110 that comprise the clustered storage 100 (step 1302).

(3) As the next step, when the administrator designates the node 110-1, 110-2, 110-3 in which the port 180 for the logical volume in question exists, the management server 400 displays a list of names of a plurality of ports 180 that the nod.) 110-1, 110-2, 110-3 has (step 1308).

(4) As the next step, when the administrator designates the port 180 for the logical volume in question, the management server 400 displays a list of names of logical volumes related to the port 180 (step 1304).

(5) As the next step, when the administrator designates the logical volume that he or she is interested in, the management server 400 displays a list of names of the nodes 110 in which the physical disks 130 that store the data of the logical volume in question exist (steps 1305).

(6) As the next step, when the administrator designates the node 110 that he or she is interested in, the management server 400 displays the classification, name and usage status of each resource used in the processing of the logical volume in the nodes 110. The usage status displayed here is similar to that described in the first procedure (step 1306).

Through displays as described above, the administrator can find the logical volumes that use the resources based on information such as the port names to which the logical volumes are related, the node names, the attributes of the ports 180 and address; in addition, the administrator can ascertain the processing load and resource usage status with regard to the logical volumes. The management server 400 creates and displays various display information based on the volume information 401. Names referred to in the description may be strings or numerical identifiers.

FIG. 14 is a drawing of a screen example with information displayed according to the procedures in FIGS. 12 and 13. In this screen example, the left section of the screen is a tree indicating a hierarchy based on the steps described in the procedures. In other words, in the first procedure, a hierarchy of objects in a tree structure is displayed as the root (the entire target of management of the management server 400)—the clustered storages 100—the nodes 110—resources such as the processor, the memory, the cache 120, the physical disks 130 and the bus 140—modules of each resource (for example, in the case of the physical disks 130, a specific physical disk 130)—logical volumes that use the resources and modules— the ports 180. And in the second procedure a hierarchy of objects in a tree structure is displayed as the root (the entire target of management of the management server 400)—the clustered storages 100—the nodes 110—the ports 180—the logical volumes—the nodes 110—resources such as the processor, the memory, the cache 120, the physical disks 130, the bus 140—modules of each resource (for example, in the case of the physical disks 130, a specific physical disk 130).

An object selected is indicated as such by changing its display color, changing its symbol, or by displaying a symbol. The top right section of the screen shows information such as the name, properties and usage status of the object selected in the tree. The bottom right section of the screen is a section to display detailed information, e.g., if the object has a plurality of components, a list of information such as the name and usage status of each component is displayed; and if the object has no components, information concerning the object is displayed. In addition, a history of usage status for a time period designated by the administrator can be displayed as a graph, which can be used to improve the work efficiency of the administrator.

In the first procedure described above, the management server 400 is warned that there is an excessive load or excessive resource usage, and it can caution and guide the system administrator, maintenance staff or the user by changing the display color, displaying a symbol, or flashing the symbol for the target of warning, whether it is the clustered storage 100, the node 110, a resource or a module in the tree and in the list.

Based on such warning or on his or her interest, the system administrator, maintenance staff or the user can obtain information by following the procedure as he or she follows the tree and selects objects, and thereby analyze reduced performance and the cause of the reduced performance in the clustered storage 100, and in particular investigate a concentration of processing load on a certain node 110 or a concentration of usage on a certain resource.

FIG. 15 is a drawing of another screen example of information displayed according to the first procedure in FIG. 12. Instead of the tree shown in FIG. 14, a single path displaying only the targets of warning can be shown as in FIG. 15, for the first procedure. Through such display, the possibility of confusing a user unfamiliar with the procedure can be reduced. Alternatively, the present invention can provide information based on the procedure described above using interactive screen transitions instead of guiding the user through trees.

By presenting information in steps and in a hierarchy as described above, the embodiment according to the present invention eliminates the need of the system administrator, maintenance staff or the user to simultaneously analyze numerous types and large amounts of information, so that the management of the computer system and the clustered storages 100 having a configuration as shown in FIG. 1 can be done efficiently and easily, which can reduce management costs.

Next, we will describe how the management server 400 presents to administrators such as the system administrator, maintenance staff or the user information that supports the determination of a logical volume that is to be moved from one node 110-1, 110-2, 110-3 to another node 110-1, 110-2, 110-3 and the determination of the destination of the logical volume. Based on the information provided by the management server 400 through screen displays described later, the system administrator, maintenance staff or the user can select the source logical volume and the destination whose selection would eliminate causes of reduced performance such as a concentration of load on a certain node 110 or of usage on a certain resource.

To determine the source logical volume, the administrator uses the information presentation method and screens, which were described earlier and are provided by the management server 400, to specify a logical volume that is causing a concentration of load on a certain node 110 or a concentration of usage on a certain resource and thereby select the logical volume to be moved. Further, by having the management server 400, through the procedure described above, display information such as the name, model name, capacity, maximum transfer speed, maximum transfer speed distribution, average rotational delay and utilization (for each access classification) regarding the physical disks 130 that store data of the logical volume designated by the administrator, the administrator can select the source logical volume taking into consideration not only the processing load and resource usage status with regard to the logical volume, but also the optimum performance and capacity usage of the physical disks 130.

The management server 400 presents information according to the following destination selection procedure that the administrator performs in determining the destination physical disk 130.

FIG. 16 is a flowchart that describes the procedure for selecting the destination, and we will describe this next.

(1) As a first step, the management server 400 displays a list of names of a plurality of nodes 110 that comprises the clustered storage 100 in which the source logical volume exists (step 1401).

(2) As the next step, when the administrator designates the node 110 that he or she is interested in as a destination candidate, the management server 400 displays a list of classifications and names of various resources that the node 110 has (step 1402).

(3) As the next step, when the administrator designates the resource he or she is interested in, the usage status of the resource is displayed. The information displayed is similar to that described in the first procedure (step 1403).

(4) Based on the preceding display, the administrator can search for a node 110 with a small processing load and resources whose usage is low. In addition, the management server 400 displays the free area of the physical disks 130 based on the free area information 404. Since display information for each physical disk 130 includes information such as the name, model name, capacity, maximum transfer speed, maximum transfer speed distribution, average rotational delay and utilization (for each access classification), the administrator can select the destination physical disk 130 taking into consideration not only the processing load and resource usage status of the node 110, but also the optimum performance and capacity usage of the physical disk 130. In addition, the free area can be displayed as one of the resources, along with other information concerning each physical disk 130 (step 1404).

(5) As the next step, the management server 400 displays the logical volumes whose data are stored in the physical disk 130, along with information such as the name, attributes, properties and the nodes 110 of the ports 180 to which the logical volumes are related (step 1405).

Based on the information displayed in the processing described above, the administrator can take into consideration the impact the selection of the destination node 110 can have on the processing of other logical volumes. Ultimately, the administrator makes the determination by selecting the destination node 110 and the physical disk 130 of the node 110.

FIG. 17 is a drawing of a screen example that is displayed in accordance with the procedure described in FIG. 16 and through which the administrator determines the destination; we will describe this figure next.

The screen example in FIG. 17 is generally divided into two vertically, where selected objects are found one each in the top screen and the bottom screen and the administrator uses the top screen to select the source logical volume. The top screen is basically the same as the screen example of the information displayed in accordance with the second procedure, in which the resource usage status is investigated; for this reason, we will describe only the bottom screen below.

The left section of the bottom screen is a tree indicating a hierarchy based on the steps in the destination selection procedure described in FIG. 16, and it shows the components and resources of the clustered storage 100 currently selected in the top screen. In other words, the tree shows a hierarchy of the root (the clustered storage 100 currently selected in the top screen)—the nodes 110—resources such as the processor, the memory, the cache 120, the physical disks 130 and the bus 140—the logical volumes that use the resources and modules—the ports 180; and branching off from the nodes 110, it also shows a hierarchy of—free area—the physical disks 130. The right section of the bottom screen is similar to the information display screen for the resource usage status investigation described earlier, where the top right section displays the name, properties and usage status, while the bottom right section displays detailed information.

By selecting the object or a list item that represents the logical volume in the top screen and doing a drag-and-drop to the object or a list item that represents the physical disk 130 in the bottom screen, the administrator can determine the source and destination and thereby direct a logical volume to move. Further, the administrator can use the menu to select a dialogue box for setting and can input using a list box or text box to make the determination and give instructions. The management server 400 can automatically allocate the destination physical address of the physical disk 130 as it refers to the free area information 404 and the capacity of the source logical volume in the volume information 401, or the administrator can input it using the method described above. When the management server 400 refers to the volume information 401 and the free area information 404 and finds that the move directed cannot be carried out due to insufficient free area in the destination physical disk 130, it notifies the administrator.

Next, we will describe the processing that takes place when the clustered storage 100 performs move processing of a logical volume. The move processing of a logical volume is executed according to the flow shown in FIGS. 18 through 21.

FIG. 18 is a flowchart that describes the processing operation for data copy instruction; we will describe this first.

(1) As described above, the administrator, whether the system administrator, maintenance staff or the user, determines the source logical volume and the destination physical disk 130 and directs the management server 400 to move the data (step 1501).

(2) Upon receiving the instruction, the management server 400 saves an area designated as the destination from the free area information 404, refers to the volume information 401 to obtain information concerning the port 180 to which the source logical volume is related and the node 110 (the node A 110-1 in this case) in the clustered storage 100 in which the source logical volume exists, and directs the CHP 200 of the node A 110-1 via the management network 490 to move the source logical volume to the destination physical disk 130. If there is a plurality of ports 180 to which the source logical volume is related, the management server 400 gives the instruction to all nodes 110 in which the relevant ports 180 exist. The instruction includes the source logical volume number, the destination node number, the destination physical disk number and the destination physical address (steps 1502 and 0503).

(3) The CHP 200 of the node A 110-1 that received the instruction sets the destination node number, the destination physical disk number and the destination physical address as entries for the source logical volume number in the physical position information 202 and sets the status to "moving" (step 1504).

(4) Next, the CHP 200 of the node A 110-1 refers to the physical position information 202, obtains information concerning the node 110 (the node B 110-2 in this case) that stores the data of the source logical volume, and notifies the CHP 200 and DKP 300 of the node B 110-2 via the internal connection bus 170 of parameters such as the source physical disk number, the source physical address, the capacity, the destination node number, the destination physical disk number and the destination physical address, while at the same time directing them to copy the data (step 1505).

FIG. 19 is a flowchart describing the processing operation for data copying that the DKPs 300 of the node B 110-2 and the node C 110-3 perform; we will describe this next.

(1) The DKP 300 of the node B 110-2 that received the instruction to copy in the processing that takes place in FIG. 18 notifies, via the internal connection bus 170, the DKP 300 of the destination node 110 (the node C 110-3 in this case), which was indicated by the parameters, of the capacity, the destination physical disk number and the destination physical address; at the same time it notifies the DKP 300 of the node C 110-3 via the internal connection bus 170 to begin copying, reads data from the source area of the physical disk 130 indicated by the parameters, and transfers the data via the internal connection bus 170 to the DKP 300 of the node C 110-3 (step 1601).

(2) The DKP 300 of the node C 110-3 that received the notice writes the transferred data onto the destination area on the physical disk 130 as notified (step 1602).

(3) Upon receiving a notice of write completion from the DKP 300 of the node C 110-3, the DKP 300 of the node B 110-2 that transferred all data notifies the CHP 200 of the node A 110-1 via the internal connection bus 170 of the completion of data copying (steps 1603 and 1604).

FIG. 20 is a flowchart describing the processing operation for the data copying that the CHPs 200 of the node B 110-2 and the node C 110-3 perform; we will describe this next.

(1) The CHP 200 of the node B 110-2 that received the instruction to copy from the node A 110-1 in the processing that takes place in FIG. 18 notifies, via the internal connection bus 170, the CHP 200 of the node C 110-3, which was indicated by the parameters, of the capacity, the destination physical disk number and the destination physical address; at the same time it notifies the CHP 200 of the node C 110-3 via the internal connection bus 170 to begin copying, refers to the cache management information 203 to search for source data that exists in the cache 120, and notifies the CHP 200 of the node C 110-3 of the physical disk number and physical address of data that exists (step 1701).

(2) Upon receiving the notice, the CHP 200 of the node C 110-3 retains the physical disk number and physical address information, and if there is a write processing described later, it records that a write target range has been updated (step 1702).

(3) Next, the CHP 200 of the node B 110-2 transfers via the internal connection bus 170 the data in the cache 120, along with the physical disk number and the physical address, to the CHP 200 of the node C 110-3 (step 1703).

(4) Upon receiving the data, the CHP 200 of the node C 110-3 refers to the physical disk number and physical address information, and if the data has not been updated it updates the cache management information 203 and stores the data in the cache 120. However, if the data has already been updated, it does not store the transferred data in the cache 120 (steps 1704 and 1705).

(5) Upon receiving a notice of reflection completion from the CHP 200 of the node C 110-3, the CHP 200 of the node B 110-2 that transferred all data notifies, via the internal connection bus 170, the CHP 200 of the node A 110-1 of the completion of data copying (steps 1706 and 1707).

FIG. 21 is a flowchart that describes the processing operation for updating the physical position information in the CHP 200; we will describe this next.

(1) Upon receiving a notice of completion of data copying from the CHP 200 and the DKP 300 of the node B 110-2, the CHP 200 of the node A 110-1 temporarily postpones accepting commands from the hosts 500 to read/write onto the source logical volume (steps 1801 and 1802).

(2) The CHP 200 of the node A 110-1 sets the destination node number as the node number, the destination physical disk number as the physical disk number, and the destination physical address as the physical address in the physical position information 202 (step 1803).

(3) Next, the CHP 200 of the node A 110-1 reports the completion of move to the management server 400 via the management network 490 and resumes accepting commands to read/write onto the logical volume (steps 1804 and 1805).

(4) Upon receiving a report of completion of move from the CHPs 200 of all nodes 110 that directed the move, including the node A 110-1, the management server 400 directs the CHP 200 of the node A 110-1 via the management network 490 to restore the "normal" status. If there is a plurality of ports 180 to which the source logical volume is related, the management server 400 gives the same instruction to all nodes 110 in which the relevant ports 180 exist (step 1806).

(5) Upon receiving the instruction, the CHP 200 of the node A 110-1 sets "normal" as the status in the physical position information 202 and reports via the management network 490 to the management server 400 of completion of status restoration (steps 1807 and 1808).

(6) Upon receiving the report of completion from the CHPs 200 of all nodes 110 that directed the move, including the node A 110-1, the management server 400 sets the destination node number as the node number, the destination physical disk number as the physical disk number and the destination physical address as the physical address in entries for the source logical volume in the volume information 401; it also deletes the destination area from the free area information 404, adds the source area to the free area information 404, and updates the free area information 404 (steps 1809 and 1810).

In the processing described above, if the CHP 200 of the node A 110-1 receives a read command while the status of the physical position information 202 is "moving," a normal read processing described earlier is performed on the node B 110-2. If the CHP 200 of the node A 110-1 receives a write command while the status of the physical position information 202 is "moving," the CHP 200 of the node A 110-1 refers to the physical position information 202 and performs the write processing on both the node B 110-2 and the destination node C 110-3. The CHP 200 of the node C 110-3 manages area updating similar to the area updating described above. Through such processing, the write data is reflected on both the source node B 110-2 and the destination node C 110-3, so that copy consistency can be maintained.

Various processing in the embodiment according to the present invention can be configured as a processing program, and such a processing program can be stored and provided in recording medium such as HD, DAT, FD, MO, DVD-ROM and CD-ROM.

Through the processing described above, the embodiment according to the present invention can move the physical positions of logical volumes in a manner accessible by and transparent to the host 500 and can move the processing load and resource usage load for the logical volumes to other nodes 110.

In the embodiment of the present invention, read/write processing of logical volumes was described as processing that uses the resources of the nodes 110, but the present invention also allows processing similar to that described above in order to make the logical volume data to be resident on the cache 120, to create internal copies (create snapshots), or to perform copy processing to other storage systems, by having the CHPs 200 and the DKPs 300 of the various nodes 110 obtain resource usage status and having the management server 400 collect it.

In the embodiment according to the present invention, the management server 400 was described as being external to the clustered storage 100; however, the clustered storage 100 may contain the management server 400 internally so that together they are provided as a unitary device to the user, in accordance with the present invention. Further, in the embodiment according to the present invention, information regarding various resources was described to be collected, tallied and presented for each node 110 that is physically independent of other nodes 110. However, when the resources of the various nodes 110 are logically divided and each divided unit operates as an independent virtual processing device, collecting, tallying and presenting can be performed on a divided unit-by-divided unit basis.

In accordance with the embodiment of the present invention, by performing the processing as described above, administrators such as the system administrator, maintenance staff or the user can recognize the relationship between a logical volume and a node that stores and processes the data of the logical volume, ascertain and manage the resource usage status of each node, so that analysis and investigation can be done efficiently in the event of problems such as a concentration of processing load on a certain node 110 or of usage on a certain resource, which makes the management of the computer system and the clustered storage 100 easy and reduces management costs.

Moreover, in accordance with the embodiment of the present invention, administrators such as the system administrator, maintenance staff or the user can solve problems described above by moving logical volumes in a manner transparent to the host and thereby improve the performance of the computer system and the clustered storage.

According to the present invention described above, administrators can ascertain and manage the resource usage status of each node, so that analysis and investigation can be done efficiently in the event of problems such as a concentration of processing load on a certain node or of usage on a certain resource, which reduces management costs of clustered storage systems.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A clustered storage system including a plurality of storage systems that operate as a single storage system, the clustered storage system comprising:

a process that obtains a configuration of resources, including both resource size used and resource usage load, of each of the storage systems used in processing data that is stored in the storage systems;

a first process that presents relations between address information provided by the clustered storage system and resource information of each of the storage systems to a computer that uses the data;

a second process that presents the resource information based on the relations;

a process that first presents information about the clustered storage system, secondly presents information about a specified one of the plurality of storage systems, which shares cache resource among the plurality of storage systems, and thirdly presents information about resources of the specified one of the plurality of storage systems upon presentation by the first process and the second process;

a process that a user selects a destination storage system to relocate data among the plurality of storage systems after the user is presented with the address information, the resource information of each of the storage systems, and the resource information based on the relations;

a process that maintains and displays a history of usage status from each of the plurality of storage systems; and a process that relocates data among the plurality of storage systems, taking into consideration the resource size used and the resource usage load of both a source storage system and the destination storage system of the data to be relocated, wherein a specific physical storage device within the destination storage system is selected by the user to store the relocated data in, each of the plurality of storage systems includes:

a plurality of ports receiving data from at least one computer;

a controller processing data from said at least one computer; and a plurality of physical drives for storing data, one storage system is coupled to other storage systems of the plurality of storage systems, the configuration of resources includes port information concerning the plurality of ports and usage of the plurality of physical drives, if the source storage system receives a write request for a source logical volume from a computer, the destination storage system determines if a status of a logical volume to write the data is moving, normal or failure, if the status is normal, the source storage system obtains information of the destination storage system and transfers data for the write request to the destination storage system and the destination storage system stores the data in a target logical volume, if the status is failure, the source storage system notifies a write failure to the computer and terminates a write processing for the write request, and if the status is moving, the source storage system stores the data in the source logical volume and the destination storage system stores the data in the target logical volume.

2. A clustered storage system according to claim 1, further comprising a process that notifies a warning when at least one of a resource size used, a resource usage load and a processing load in each of the storage systems exceeds a specified threshold value.

3. A clustered storage system according to claim 1, wherein the process that relocates data also chooses a destination physical storage address in the chosen physical storage device to store the relocated data in.

4. A clustered storage system according to claim 1, wherein the process that relocates data also takes into consideration the optimum performance and capacity usage of physical storage devices within the storage systems in choosing the destination storage system and the specific physical storage device.

5. A clustered storage system according to claim 1, wherein the resource information comprises a logical volume number, a node number, a physical disk number, and a physical address.

6. A clustered storage system according to claim 1, further comprising a host computer and a management server, that presents the information.

7. A clustered storage system according to claim 1, the clustered storage system further comprising:
a management server including a screen,
wherein the management server presents the resource information and the address information of the storage system stored migrating data and the target storage system based on the relations on the screen.

8. A method for controlling a cluster storage system having a plurality of storage systems that operate as a single storage system, comprising the steps of:
obtaining a configuration of resources, including both resource size used and resource usage load, of each of the storage systems used in processing data that is stored in the storage systems;
presenting relations between address information provided by the clustered storage system and resource information of each of the storage systems to a computer that uses the data;
first, presenting information about the clustered storage system, second, presenting information about a specified one of the plurality of storage systems, which shares cache resource among the plurality of storage systems, and, third, presenting information about resources of the specified one of the plurality of storage systems upon presentation by the first process and the second process;
presenting the resource information based on the relations;
selecting by a user a destination storage system to relocate data among the plurality of storage systems after the user is presented with the address information, the resource information of each of the storage systems, and the resource information based on the relations;
maintaining and displaying a history of usage status from each of the plurality of storage systems; and
relocating data among the plurality of storage systems, taking into consideration the resource size used and the resource usage load of both a source storage system and the destination storage system of the data to be relocated, wherein
a specific physical storage device within the destination storage system is selected by the user to store the relocated data,
each of the plurality of storage systems includes:
a plurality of ports receiving data from at least one computer;
a controller processing data from said at least one computer; and
a plurality of physical drives for storing data,
one storage system is coupled to other storage systems of the plurality of storage systems,
the configuration of resources includes port information concerning the plurality of ports and usage of the plurality of physical drives,
if the source storage system receives a write request for a source logical volume from a computer, the destination storage system determines if a status of a logical volume to write the data is moving, normal or failure,
if the status is normal, the source storage system obtains information of the destination storage system and transfers data for the write request to the destination storage system and the destination storage system stores the data in a target logical volume,
if the status is failure, the source storage system notifies a write failure to the computer and terminates a write processing for the write request, and
if the status is moving, the source storage system stores the data in the source logical volume and the destination storage system stores the data in the target logical volume.

9. A method for controlling a clustered storage system according to claim 8, further comprising:
a first step of presenting information about the clustered storage system;
a second step of presenting information about a specified one of the plurality of storage systems; and
a third step of presenting information about resources of the specified one of the plurality of storage systems upon presentation.

10. A method for controlling a clustered storage system according to claim 8, further comprising a step of notifying a warning when at least one of a resource size used, a resource usage load and a processing load in each of the storage systems exceeds a specified threshold value.

11. A method for controlling a cluster storage system according to claim 8, wherein the resource information comprises a logical volume number, a node number, a physical disk number, and a physical address.

12. A method for controlling a cluster storage system according to claim 8, wherein the cluster storage system further comprises a host computer and a management server presenting the information.

13. A method for controlling a cluster storage system having a plurality of storage systems that operate as a single storage system, comprising the steps of:
obtaining a configuration of resources, and at least one of resource size used and resource usage load, of each of the storage systems used in processing data that is stored in the storage systems;
presenting relations between address information provided by the clustered storage system and resource information of each of the storage systems to a computer that uses the data;
first, presenting information about the clustered storage system, second, presenting information about a specified one of the plurality of storage systems, which shares cache resource among the plurality of storage systems, and, third, presenting information about resources of the specified one of the plurality of storage systems upon presentation by the first process and the second process;

presenting the resource information based on the relations;

selecting by a user a destination storage system to relocate data among the plurality of storage systems after the user is presented with the address information, the resource information of each of the storage systems, and the resource information based on the relations;

maintaining and displaying a history of usage status from each of the plurality of storage systems; and relocating data among the plurality of storage systems, taking into consideration the resource size used and the resource usage load of both a source storage system and the destination storage system of the data to be relocated, wherein a specific physical storage device within the destination storage system is selected by the user to store the relocated data, each of the plurality of storage systems includes:
- a plurality of ports receiving data from at least one computer;
- a controller processing data from said at least one computer; and
- a plurality of physical drives for storing data, one storage system is coupled to other storage systems of the plurality of storage systems, the configuration of resources includes port information concerning the plurality of ports and usage of the plurality of physical drives, if the source storage system receives a write request for a source logical volume from a computer, the destination storage system determines if a status of a logical volume to write the data is moving, normal or failure, if the status is normal, the source storage system obtains information of the destination storage system and transfers data for the write request to the destination storage system and the destination storage system stores the data in a target logical volume, if the status is failure, the source storage system notifies a write failure to the computer and terminates a write processing for the write request, and if the status is moving, the source storage system stores the data in the source logical volume and the destination storage system stores the data in the target logical volume.

14. A method for controlling a clustered storage system according to claim 13, further comprising:
- a first step of presenting information about the clustered storage system;
- a second step of presenting information about a specified one of the plurality of storage systems; and
- a third step of presenting information about resources of the specified one of the plurality of storage systems upon presentation.

15. A method for controlling a clustered storage system according to claim 13, further comprising a step of notifying a warning when at least one of a resource size used, a resource usage load and a processing load in each of the storage systems exceeds a specified threshold value.

16. A method for controlling a cluster storage system according to claim 13, wherein the resource information comprises a logical volume number, a node number, a physical disk number, and a physical address.

17. A method for controlling a cluster storage system according to claim 13, wherein the cluster storage system further comprises a host computer and a management server presenting the information.

18. A processing program, stored in a recording medium, executable by a processor for controlling a cluster storage system having a plurality of storage systems that operate as a single storage system, the processing program comprising:

a program for obtaining a configuration of resources, and at least one of resource size used and resource usage load, of each of the storage systems used in processing data that is stored in the storage systems;

a program for presenting relations between address information provided by the clustered storage system and resource information of each of the storage systems to a computer that uses the data;

a program for, first, presenting information about the clustered storage system, second, presenting information about a specified one of the plurality of storage systems, which shares cache resource among the plurality of storage systems, and, third, presenting information about resources of the specified one of the plurality of storage systems upon presentation by the first process and the second process;

a program for presenting the resource information based on the relations;

a program for a user to select a destination storage system to relocate data among the plurality of storage systems after the user is presented with the address information, the resource information of each of the storage systems, and the resource information based on the relations;

a program for maintaining and displaying a history of usage status from each of the plurality of storage systems; and a program for relocating data among the plurality of storage systems, taking into consideration the resource size used and the resource usage load of both a source storage system and the destination storage system of the data to be relocated, wherein a specific physical storage device within the destination storage system is selected by the user to store the relocated data, each of the plurality of storage systems includes:
- a plurality of ports receiving data from at least one computer;
- a controller processing data from said at least one computer; and
- a plurality of physical drives for storing data, one storage system is coupled to other storage systems of the plurality of storage systems, the configuration of resources includes port information concerning the plurality of ports and usage of the plurality of physical drives, if the source storage system receives a write request for a source logical volume from a computer, the destination storage system determines if a status of a logical volume to write the data is moving, normal or failure, if the status is normal, the source storage system obtains information of the destination storage system and transfers data for the write request to the destination storage system and the destination storage system stores the data in a target logical volume, if the status is failure, the source storage system notifies a write failure to the computer and terminates a write processing for the write request, and if the status is moving, the source storage system stores the data in the source logical volume and the destination storage system stores the data in the target logical volume.

19. A processing program, stored in a recording medium, for controlling a clustered storage system according to claim 18, further comprising a program for performing:

a first step for presenting information about the clustered storage system;

a second step of presenting information about a specified one of the plurality of storage systems; and a third step of presenting information about resources of the specified one of the plurality of storage systems upon presentation.

20. A processing program, stored in a recording medium, for controlling a clustered storage system according to claim 18, further comprising a program for performing a step of notifying a warning when at least one of a resource size used, a resource usage load and a processing load in each of the storage systems exceeds a specified threshold value.

21. A processing program according to claim 18, wherein the resource information comprises a logical volume number, a node number, a physical disk number, and a physical address.

22. A processing program according to claim 18, wherein the cluster storage system further comprises a host computer and a management server presenting the information.

23. A clustered storage system comprising:

a plurality of nodes, each of the nodes having a process to obtain a configuration of resources, including the size and usage load of resources that are used in processing; and a server that collectively manages the plurality of nodes, the server having comprehensive physical position information concerning data in each of the nodes, wherein the server comprises a process for obtaining relations between a configuration of the clustered storage system and a configuration of each of the nodes, a process for presenting the relations, a process for collecting and tallying resource usage status from each of the nodes, a process for relating the resource usage status, information of the data stored in each of the nodes and configuration information of, each of the nodes to each other and presenting the relations in hierarchy, a process for first, presenting information about the clustered storage system, second, presenting information about a specified one of the plurality of storage systems, which shares cache resource among the plurality of storage systems, and, third, presenting information about resources of the specified one of the plurality of storage systems upon presentation by the first process and the second process; a process for a user to select a destination node to relocate data among the plurality of nodes after the user is presented with relations, and a process that relocates data among the plurality of nodes, taking into consideration the size and the usage load of both a source node and the destination node of the data to be relocated; and a process for maintaining and displaying a history of usage status from each of the plurality of nodes, wherein a specific physical storage device within the destination node is selected by the user to store the relocated data, each of the plurality of nodes includes:

a plurality of ports receiving data from at least one computer;

a controller processing data from said at least one computer; and a plurality of physical drives for storing data, one node is coupled to other nodes of the plurality of nodes, the configuration of resources includes port information concerning the plurality of ports and usage of the plurality of physical drives, if the source node receives a write request for a source logical volume from a computer, the destination node determines if a status of a logical volume to write the data is moving, normal or failure, if the status is normal, the source node obtains information of the destination node and transfers data for the write request to the destination node and the destination node stores the data in a target logical volume, if the status is failure, the source node notifies a write failure to the computer and terminates a write processing for the write request, and if the status is moving, the source node stores the data in the source logical volume and the destination node stores the data in the target logical volume.

24. A clustered storage system according to claim 23, further comprising a process that first presents information about the clustered storage system, secondly presents information about a specified one of the plurality of nodes, and thirdly presents information about resources of the specified one of the plurality of nodes.

25. A clustered storage system according to claim 23, further comprising a process that notifies a warning when at least one of a resource size used, a resource usage load and a processing load in each of the plurality of nodes exceeds a specified threshold value.

26. A clustered storage system according to claim 23, wherein the physical position information comprises a logical volume number, a node number, a physical disk number, and a physical address.

27. A clustered storage system according to claim 23, further comprising a host computer and a management server that presents the information.

28. A clustered storage system including a plurality of storage systems, the clustered storage system comprising:

an obtaining process that obtains a configuration of resources, including both resource size used and resource usage load, of one of the storage systems used in processing data that is stored in the one of the storage systems;

a process that presents relations between information of the resources and information obtained by the obtaining device to a computer that uses the data;

a process for first, presenting information about the clustered storage system, second, presenting information about a specified one of the plurality of storage systems, which shares cache resource among the plurality of storage systems, and, third, presenting information about resources of the specified one of the plurality of storage systems upon presentation by the first process and the second process;

a process that a user selects a destination storage system to relocate data among the plurality of storage systems after the user is presented with the relations between information of the resources and information obtained by the obtaining device;

a process that maintains and displays a history of usage status from each of the plurality of storage systems; and a process that relocates data among the plurality of storage systems, taking into consideration the resource size used and the resource usage load of both a source storage system and the destination storage system of the data to be relocated, wherein a specific physical storage device within the destination storage system is selected by the user to store the relocated data, each of the plurality of storage systems includes:
- a plurality of ports receiving data from at least one computer;
- a controller processing data from said at least one computer; and
- a plurality of physical drives for storing data, one storage system is coupled to other storage systems of the plurality of storage systems, the configuration of resources includes port information concerning the plurality of ports and usage of the plurality of physical drives, if the source storage system receives a write request for a source logical volume from a computer, the destination storage system determines if a status of a logical volume to write the data is moving, normal or failure, if the status is normal, the source storage system obtains information of the destination storage system and transfers data for the write request to the destination storage system and the destination storage system stores the data in a target logical volume, if the status is failure, the source storage system notifies a write failure to the computer and terminates a write processing for the write request, and if the status is moving, the source storage system stores the data in the source logical volume and the destination storage system stores the data in the target logical volume.

29. A clustered storage system according to claim 28, further comprising a process that first presents information about the clustered storage system, secondly presents information about a specified one of the plurality of storage systems, and thirdly presents information about resources of the specified one of the plurality of storage systems.

30. A clustered storage system according to claim 28, further comprising a process that notifies a warning when at least one of a resource size used, a resource usage load and a processing load in each of the storage systems exceeds a specified threshold value.

31. A clustered storage system according to claim 28, wherein the resource information comprises a logical volume number, a node number, a physical disk number, and a physical address.

32. A clustered storage system according to claim 28, further comprising a host computer and a management server that presents the information.

* * * * *